(12) United States Patent
Goto

(10) Patent No.: US 7,751,210 B2
(45) Date of Patent: *Jul. 6, 2010

(54) INVERTER DEVICE WITH IMPROVED 3-PHASE PULSE WIDTH MODULATION AND VEHICLE AIR CONDITIONER USING THE SAME

(75) Inventor: Naomi Goto, Shiga (JP)

(73) Assignee: Panasonic Corporation, Osaka (JP)

( * ) Notice: Subject to any disclaimer, the term of this patent is extended or adjusted under 35 U.S.C. 154(b) by 602 days.

This patent is subject to a terminal disclaimer.

(21) Appl. No.: 11/570,639

(22) PCT Filed: Jun. 8, 2005

(86) PCT No.: PCT/JP2005/010469

§ 371 (c)(1),
(2), (4) Date: Dec. 14, 2006

(87) PCT Pub. No.: WO2006/001169

PCT Pub. Date: Jan. 5, 2006

(65) Prior Publication Data

US 2008/0273360 A1    Nov. 6, 2008

(30) Foreign Application Priority Data

Jun. 25, 2004    (JP)    ............................ 2004-187352
Mar. 14, 2005    (JP)    ............................ 2005-070677

(51) Int. Cl.
*H02M 7/5387* (2007.01)

(52) U.S. Cl. ........................... 363/98; 363/132; 363/97

(58) Field of Classification Search ................... 363/98, 363/132
See application file for complete search history.

(56) References Cited

U.S. PATENT DOCUMENTS

| | | | | |
|---|---|---|---|---|
| 4,458,194 A | * | 7/1984 | Geppert et al. | 318/811 |
| 5,463,300 A | * | 10/1995 | Oximberg | 318/801 |
| 6,124,688 A | * | 9/2000 | Coles et al. | 318/400.09 |
| 6,529,393 B1 | * | 3/2003 | Yu | 363/41 |
| 7,042,741 B2 | * | 5/2006 | Tanaka et al. | 363/41 |
| 7,583,523 B2 | * | 9/2009 | Goto | 363/98 |
| 2003/0137857 A1 | | 7/2003 | Yamanaka et al. | |

(Continued)

FOREIGN PATENT DOCUMENTS

JP    2002-136152 A    5/2002

(Continued)

OTHER PUBLICATIONS

International Search Report for PCT/JP2005/010469, dated Jul. 12, 2005.

*Primary Examiner*—Patrick J Assouad
*Assistant Examiner*—Manuel Hernandez
(74) *Attorney, Agent, or Firm*—RatnerPrestia

(57) ABSTRACT

The inverter device contains three sets of series circuit formed by connecting two switching elements (2) in series between a positive terminal and a negative terminal of DC power supply (1). Connecting points of the two switching elements are connected to motor (11). DC voltage of DC power supply (1) is switched by PWM 3-phase modulation so that a sinusoidal wave-shaped AC current is fed to the motor. Upper-arm switching elements connected to the positive terminal of the DC power supply increase or decrease an ON period equally in all phases for a carrier cycle in the PWM 3-phase modulation so as to provide two conducting period in the carrier cycle.

14 Claims, 23 Drawing Sheets

U.S. PATENT DOCUMENTS

| | | | | |
|---|---|---|---|---|
| 2005/0226607 | A1* | 10/2005 | Williams et al. | 388/819 |
| 2007/0189048 | A1* | 8/2007 | Goto | 363/95 |
| 2009/0167223 | A1* | 7/2009 | Goto et al. | 318/400.17 |
| 2009/0263260 | A1* | 10/2009 | Goto et al. | 417/410.1 |

FOREIGN PATENT DOCUMENTS

| | | |
|---|---|---|
| JP | 2002-247860 A | 8/2002 |
| JP | 2003-189670 A | 7/2003 |
| WO | WO 01/65675 | 9/2001 |

\* cited by examiner

INVERTER DEVICE WITH IMPROVED 3-PHASE PULSE WIDTH MODULATION AND VEHICLE AIR CONDITIONER USING THE SAME

This application is a U.S. National Phase Application of PCT International Application PCT/JP2005/010469.

TECHNICAL FIELD

The present invention relates to an inverter device for driving a motor by pulse width modulation (hereinafter referred to as PWM) with three phases, i.e., PWM 3-phase modulation.

BACKGROUND ART

As such a type of conventional inverter device, for example, Japanese Patent Unexamined Publication No. 2003-189670 discloses a device that works on a sine-wave drive system by PWM 2-phase modulation.

Hereinafter will be described the aforementioned drive system. FIG. 23 is an electric circuit diagram showing a sine-wave driving inverter device and the peripheral circuits thereof. Control circuit 107 of inverter device 121 detects the position of magnet rotor 105 that constitutes sensorless DC brushless motor 111 by calculating current values fed from current sensor 106. According to an rpm instruction signal (not shown) and the like, control circuit 107 controls switching elements 102 of inverter circuit 110 so that DC voltage from battery 101 is switched by PWM modulation. Through the modulation, sinusoidal wave-shaped AC current is fed to stator winding 104 of sensorless DC brushless motor (hereinafter, motor) 111.

Diodes 103 of inverter circuit 110 form a return route of current from stator winding 104. For the purpose of the explanations given hereinafter, it will be assumed that switching elements 102 are formed of upper-arm switching elements (2U, 2V, 2W) and lower-arm switching elements (2X, 2Y, 2Z), and switching elements 2U, 2V, 2W, 2X, 2Y and 2Z correspond to diodes 3U, 3V, 3W, 3X, 3Y and 3Z, respectively.

The current value detected by current sensor 106 is used for calculating power consumption and used as a judgment indicator of protecting switching elements 102 and the like. Although current sensor 106 is disposed on the minus side of the power supply line in FIG. 23, it may be disposed on the plus side, since both the sides carry a same amount of current.

FIG. 24 and FIG. 25 show characteristics of waveforms (i.e., U-phase terminal voltage 141, V-phase terminal voltage 142, W-phase terminal voltage 143 and neutral-point voltage 129) in two-phase modulation; FIG. 24 shows each waveform in two-phase modulation with a maximum modulation degree of 50%, and FIG. 25 shows the waveforms in the modulation with a maximum modulation degree of 100%. FIGS. 24 and 25 show that each terminal voltage is applied as pulse voltage with pulse width of duty (%) shown in the vertical axis of each graph. (For convenience in the description, the wording 'duty' represents the ratio of the ON period to the sum of the ON period and the OFF period.) Neutral-point voltage 129 is obtained by dividing the sum of the terminal voltage values by 3. The phase voltage exhibits sinusoidal wave, which is obtained by subtracting the value of the neutral-point voltage from the value of the terminal voltage.

FIG. 26 is a timing chart of two-phase modulation in one carrier (a carrier cycle), showing an on/off state of the upper-arm switching elements 2U, 2V, 2W and the lower-arm switching elements 2X, 2Y, 2Z. The timing chart corresponds to the phase of about 135° in two-phase modulation with a maximum modulation degree of 50% shown in FIG. 24. There are three switching patterns (a), (b) and (c), each of the current paths is shown in the electric circuit diagrams of FIG. 27A through FIG. 27C.

In the period of pattern (a), all of upper-arm switching elements 2U, 2V, 2W are turned off, and all of lower-arm switching elements 2X, 2Y, 2Z are turned on. The U-phase current and the V-phase current flow from the diodes parallel to lower-arm switching elements 2X and 2Y, respectively, to stator winding 104. The W-phase current flows from stator winding 104 to lower-arm switching element 2Z. The current flows between the lower-arm switching elements and motor 111. That is, current is not fed from battery 101 to inverter circuit 110 and motor 111.

In the period of pattern (b), upper-arm switching element 2U and lower-arm switching elements 2Y, 2Z are turned on. In this period, the U-phase current flows from upper-arm switching element 2U to stator winding 104; the V-phase current flows from the diode parallel to lower-arm switching element 2Y to stator winding 104; and the W-phase current flows from stator winding 104 to lower-arm switching element 2Z. That is, the current is fed from battery 101 to inverter circuit 110 and motor 111. In this period, the power supply line (current sensor 106) carries the U-phase current.

In the period of pattern (c), upper-arm switching elements 2U, 2V and lower-arm switching elements 2Z are turned on. In this period, the U-phase current and the V-phase current flow from upper-arm switching elements 2U and 2V, respectively, to stator winding 104; and the W-phase current flows from stator winding 104 to lower-arm switching element 2Z. That is, current is fed from battery 101 to inverter circuit 110 and motor 111. In this period, the power supply line (current sensor 106) carries the W-phase current.

The on/off state of upper-arm switching elements 2U, 2V, 2W tells that whether or not the power supply line (current sensor 106) carries current, and which phase of current flows when current is detected. That is, when all three phases are turned off, no current flows (non-conducting state); when only one phase is turned on, the current corresponding to the phase flows (conducting state); and when two phases are turned on, the current corresponding to the remaining phase flows (conducting state).

FIG. 28 shows the ON period of upper-arm switching elements 2U, 2V, 2W in one carrier (a carrier cycle) at phases of 90°, 105°, 120°, 135° and 150° in FIG. 24 (i.e., in the two-phase modulation with a maximum modulation degree of 50%). The ON period (duty) of the upper-arm switching elements is equally shown on the left and right sides from the middle of a carrier cycle. In the figure, a thin solid line represents the ON period of the U-phase; a medium solid line represents the V-phase; and a thick solid line represents the W-phase. In addition, under the ON period, the conducting period during which power supply is fed from battery 101 to stator winding 104 is indicated by an arrowed solid line, and the flowing phase current in the period is indicated by capital letters of U, V, W. The non-conducting period is indicated by an arrowed broken line. Similarly, FIG. 29 shows the ON period of the upper-arm switching elements at each phase in the two-phase modulation with a maximum modulation degree of 100% shown in FIG. 25.

In a carrier (carrier cycle) in the two-phase modulation, regardless of the phase current, the conducting period—in which electric power is fed to inverter circuit 110 and motor 111—appears once, even in a different phase.

Next will be described three-phase modulation. FIG. 30 and FIG. 31 show characteristics of waves in three-phase modulation with a maximum modulation degree of 50% and 100%, respectively. Like the two-phase modulation described above, FIGS. 30 and 31 show U-phase terminal voltage 141, V-phase terminal voltage 142, W-phase terminal voltage 143 and neutral-point voltage 129. FIG. 30 and FIG. 31 show that each terminal voltage is applied as pulse voltage with pulse width of duty (%) shown in the vertical axis of each graph. (For convenience in the description, the wording 'duty' represents the ratio of the ON period to the sum of the ON period and the OFF period.) Neutral-point voltage 129 is obtained by dividing the sum of the terminal voltage values by 3. The phase voltage exhibits sinusoidal wave, which is obtained by subtracting the value of the neutral-point voltage from the value of the terminal voltage.

FIG. 32 is a timing chart of three-phase modulation, showing an on/off state of the upper-arm switching elements (2U, 2V, 2W) and the lower-arm switching elements (2X, 2Y, 2Z) in one carrier (a carrier cycle). The timing chart corresponds to the phase of about 120° in the three-phase modulation with a maximum modulation degree of 50% shown in FIG. 30.

The switching pattern of the switching elements of the three-phase modulation has further period (d) in addition to periods (a), (b) and (c) described in the two-phase modulation. The periods (a), (b) and (c) in the three-phase modulation are the same as those in the two-phase modulation shown in FIGS. 27A through 27C and therefore the description here will be given on period (d).

In period (d), as shown in FIG. 33, all three upper-arm switching elements 2U, 2V, 2W are turned on, and all three lower-arm switching elements 2X, 2Y, 2Z are turned off. The U-phase current and V-phase current flow from upper-arm switching elements 2U and 2V, respectively, to stator winding 104. The W-phase current flows from stator winding 104 to the diode parallel to upper-arm switching element 2W. The current flows between the upper-arm switching elements and motor 111. That is, current is not fed from battery 101 to inverter circuit 110 and motor 111.

The on/off state of upper-arm switching elements 2U, 2V, 2W tells that whether or not the power supply line (current sensor 106) carries current, and which phase of current flows when current is detected. That is, when all three phases are turned off, no current flows (non-conducting state); when only one phase is turned on, the current corresponding to the phase flows (conducting state); when two phases are turned on, the current corresponding to the remaining phase flows (conducting state); and when three phases are all turned on, no current flows (non-conducting state).

FIG. 34 shows the ON period of upper-arm switching elements 2U, 2V, 2W in one carrier (a carrier cycle) at phases of 30°, 45°, 60°, 75° and 90° in FIG. 30 (i.e., in the three-phase modulation with a maximum modulation degree of 50%). The ON period (duty) of the upper-arm switching elements is equally shown on the left and right sides from the middle of a carrier cycle. In the figure, a thin solid line represents the ON period of the U-phase; a medium solid line represents the V-phase; and a thick solid line represents the W-phase. The conducting period during which power supply is fed from battery 101 to stator winding 104 is indicated by an arrowed solid line, and the flowing phase current in the period is indicated by capital letters of U, V, W. The non-conducting period is indicated by an arrowed broken line.

Similarly, FIG. 35 shows the ON period of the upper-arm switching elements at each phase in the three-phase modulation with a maximum modulation degree of 100% shown in FIG. 31. In the three-phase modulation, as shown in FIGS. 34 and 35, period (d) in the middle of a carrier cycle is a non-conducting period. The non-conducting period also appears in the beginning and the end of the carrier cycle. That is, a conducting period appears twice—one is in the first half of the carrier cycle; and the other is in the latter half of the cycle. Compared to the two-phase modulation where the conducting period appears once, the three-phase modulation has a carrier cycle shortened to half, i.e., the carrier frequency is double (hereinafter referred to as a carrier cycle-shortening effect), by which a fine and smooth PWM modulation is obtained. As compared to the two-phase modulation, the three-phase modulation generally exhibits less current ripple and torque ripple, thereby further reducing noise and vibration. However, there are some exceptions that can't offer the carrier cycle-shortening effect in the three-phase modulation above. In a carrier cycle at a phase of 30° in the modulation with a maximum modulation degree of 100%, as shown in FIG. 35, the conducting period appears once in the cycle, and therefore the carrier cycle-shortening effect cannot be obtained. Similarly, in a carrier cycle at a phase of 90° in FIG. 35, due to absence of the non-conducting period in the beginning and the end of a carrier cycle, the conducting period is linked with the ones in the previous carrier cycle and the successive cycle. Although a carrier cycle at a phase of 90° contains two conducting periods, it is equivalent to one conducting period per carrier cycle. As a result, the carrier cycle-shortening effect cannot be obtained.

In an inverter device that works on a sine-wave drive system by PWM modulation, in terms of reducing noise and vibration, the three-phase modulation is generally effective, than the two-phase modulation, in providing the carrier cycle-shortening effect. However, in the modulation with a maximum modulation degree of 100%, there are some cases where noise and vibration cannot be reduced to a desired level due to lack of the carrier cycle-shortening effect.

DISCLOSURE OF THE INVENTION

The inverter device of the present invention contains three sets of series circuits each of which has two switching elements in series between a positive terminal and a negative terminal of DC power supply. Connecting points of the two switching elements are connected to a motor. DC voltage of the DC power supply is switched by PWM 3-phase modulation so that a sinusoidal wave-shaped AC current is fed to the motor. Upper-arm switching elements, which are connected to the positive terminal of the DC power supply, increase or decrease an ON period equally in all phases for a carrier cycle of the PWM 3-phase modulation so that the carrier cycle contains two conducting periods.

With the structure above, the inverter device offers carrier cycle-shortening effect, thereby reducing noise and vibration.

REFERENCE MARKS IN THE DRAWINGS

Figure 1:
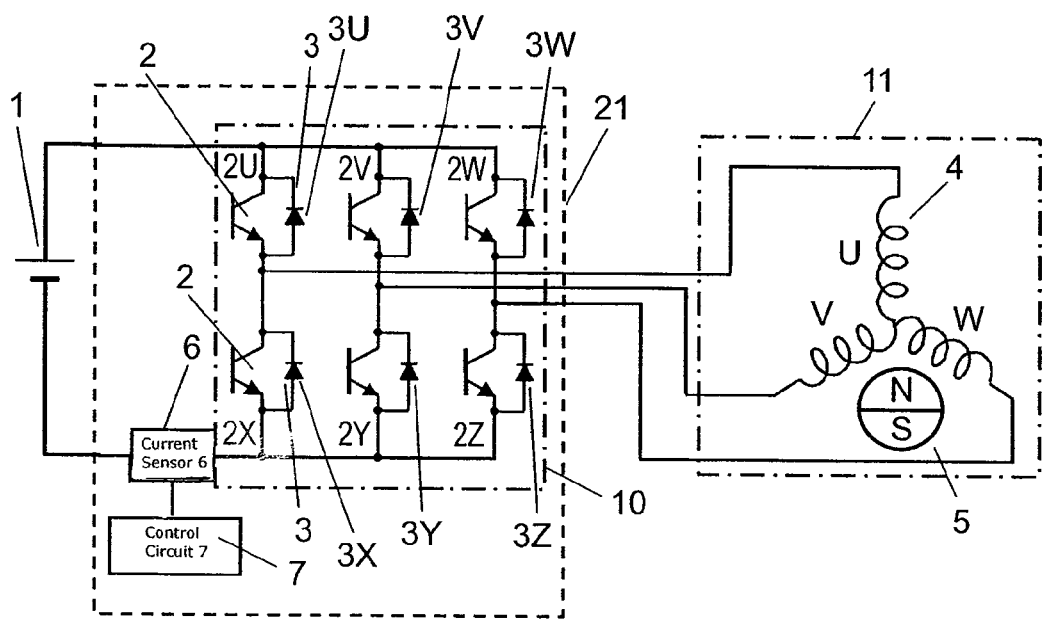
FIG. 1 is an electric circuit diagram of an inverter device of an exemplary embodiment of the present invention.

1 DC power supply
2 switching element
3 diode
4 stator winding
5 magnet rotor
6 current sensor
7 control circuit
10 inverter circuit
11 motor
21 inverter device

DETAILED DESCRIPTION OF THE PREFERRED EMBODIMENTS

The exemplary embodiments of the present invention are described hereinafter with reference to the accompanying drawings. FIG. 1 is an electric circuit diagram showing the sine-wave driving inverter device of the present invention and the peripheral circuits thereof. Control circuit 7 of inverter device 21 detects the position of magnet rotor 5 that constitutes sensorless DC brushless motor 11 by calculating current values fed from current sensor 6. According to an rpm instruction signal (not shown) and the like, control circuit 7 controls switching elements 2 of inverter circuit 10 so that DC voltage fed from DC power supply (hereinafter, battery) 1 is switched by PWM modulation. Through the modulation above, sinusoidal wave-shaped AC current is fed to stator winding 4 of sensorless DC brushless motor (hereinafter, motor) 11.

Inverter circuit 10 contains three sets of series circuits each of which has two switching elements in series between the positive and the negative terminals of battery 1. Connecting points of the two switching elements are connected to stator winding 4 of the motor. Diodes 3, which are connected in parallel to each of switching elements 2, form a return route of current from stator winding 4.

For the purpose of the explanations given hereinafter, it will be assumed that switching elements 2 are formed of upper-arm switching elements (2U, 2V, 2W), which are connected on the side of the positive terminal of battery 1; and lower-arm switching elements (2X, 2Y, 2Z), which are connected on the side of the negative terminal of battery 1. Besides, it will be assumed that switching elements 2U, 2V, 2W, 2X, 2Y and 2Z correspond to diodes 3U, 3V, 3W, 3X, 3Y and 3Z, respectively, which are connected in parallel to the switching elements.

The current value detected by current sensor 6 is used for calculating power consumption and used as a judgment indicator of protecting switching elements 2 and the like. Although current sensor 6 is disposed on the minus side of the power supply line in FIG. 1, it may be disposed on the plus side, since both the sides carry a same amount of current.

Figure 2:
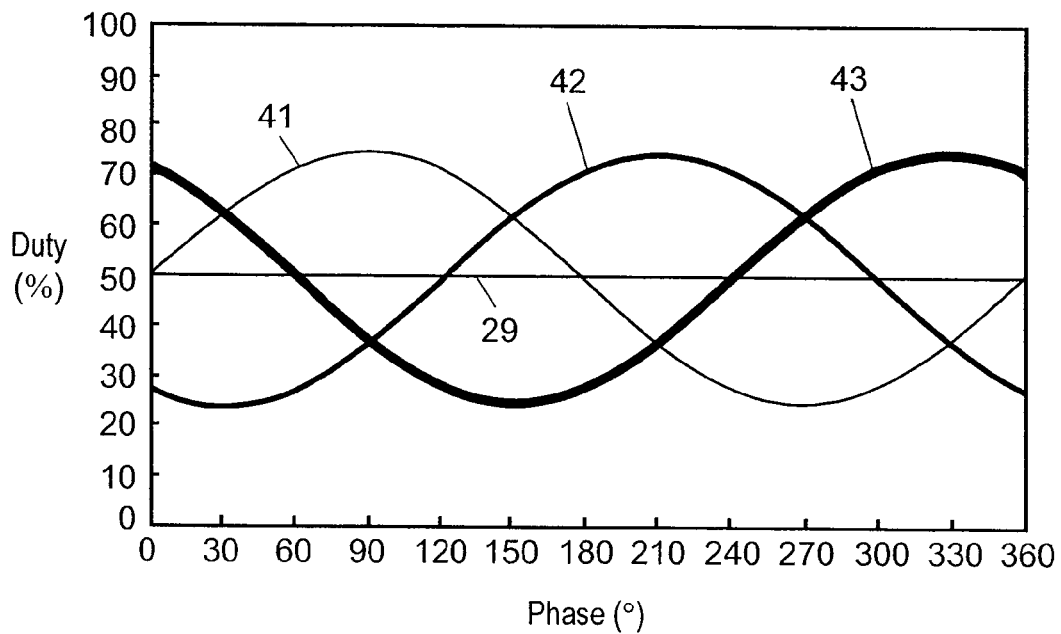
FIG. 2 shows modulated waves in each phase in three-phase modulation with a maximum modulation degree of 50% in the inverter device.
Figure 3:
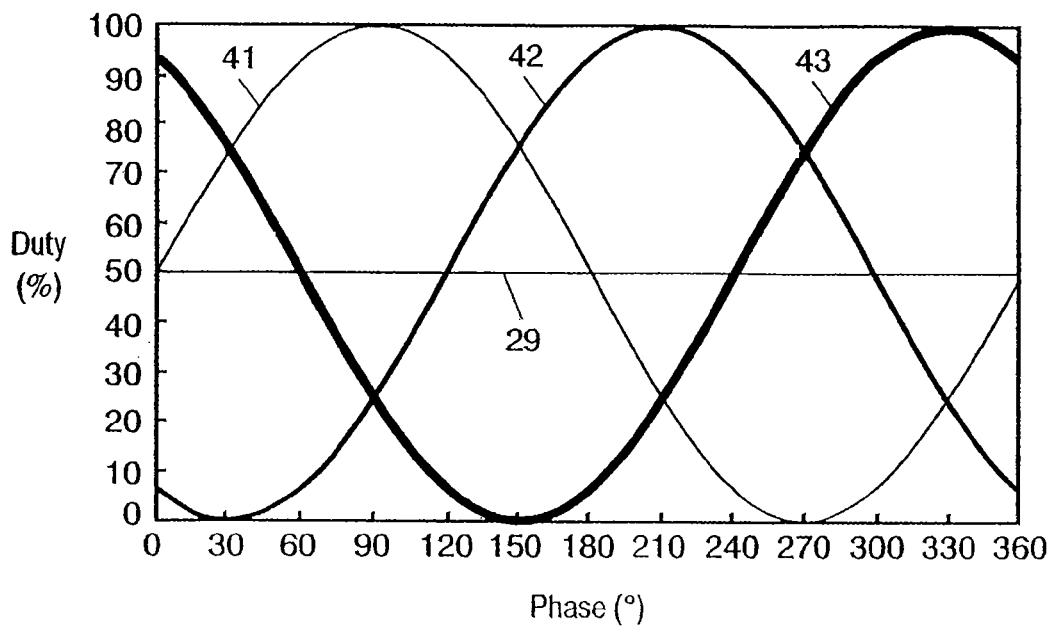
FIG. 3 shows modulated waves in each phase in three-phase modulation with a maximum modulation degree of 100% in the inverter device.

Here will be described PWM 3-phase modulation. FIG. 2 and FIG. 3 show characteristics of waveforms (i.e., U-phase terminal voltage 41, V-phase terminal voltage 42, W-phase terminal voltage 43 and neutral-point voltage 29) in the PWM 3-phase modulation. FIG. 2 shows the waveforms in the PWM 3-phase modulation with a maximum modulation degree of 50%, and FIG. 3 shows the waveforms in the modulation with a maximum modulation degree of 100%. FIGS. 2 and 3 show that each terminal voltage is applied as pulse voltage with pulse width of duty (%) shown in the vertical axis of each graph. (For convenience in the description, the wording 'duty' represents the ratio of the ON period to the sum of the ON period and the OFF period.) Neutral-point voltage 29 is obtained by dividing the sum of the terminal voltage value of each phase by 3. The phase voltage exhibits sinusoidal wave, which is obtained by subtracting the value of the neutral-point voltage from the value of the terminal voltage.

Figure 4:
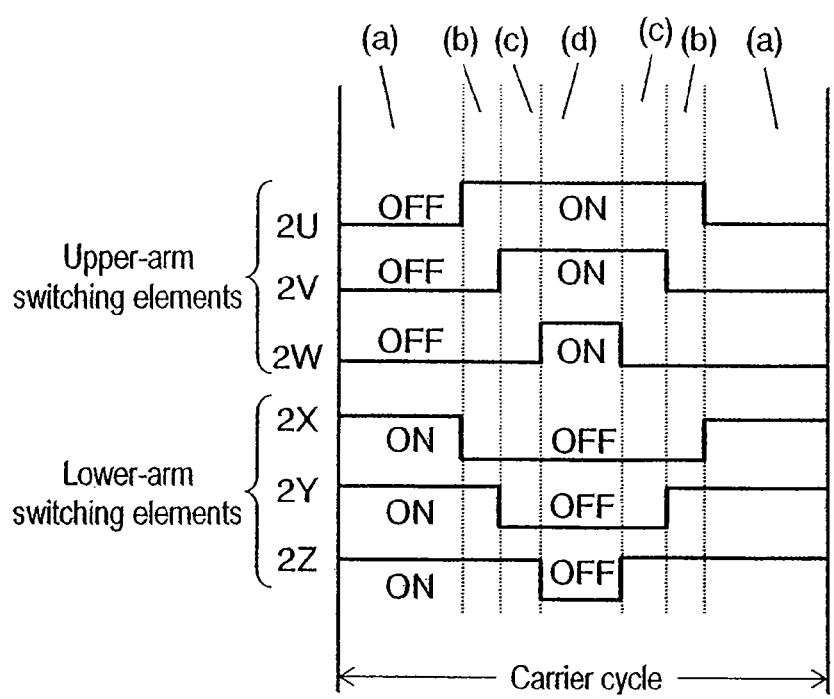
FIG. 4 is a timing chart of the three-phase modulation in the inverter device.
Figure 5A:
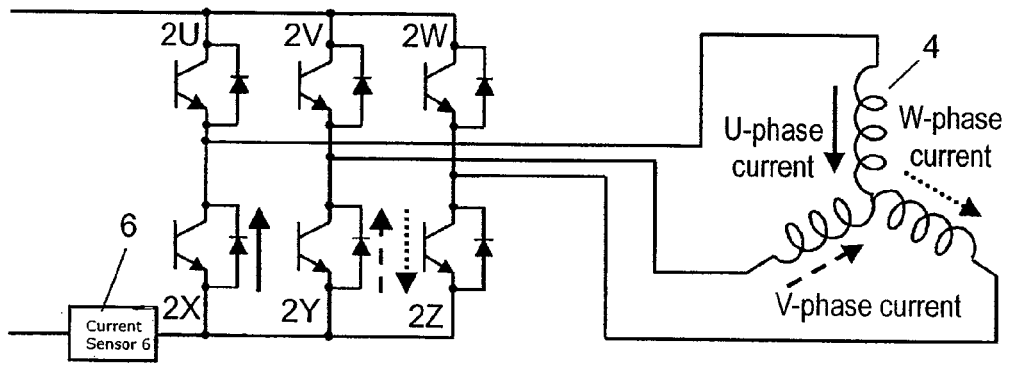
FIG. 5A is an electric circuit diagram showing the current path in period (a) in the three-phase modulation.
Figure 5B:
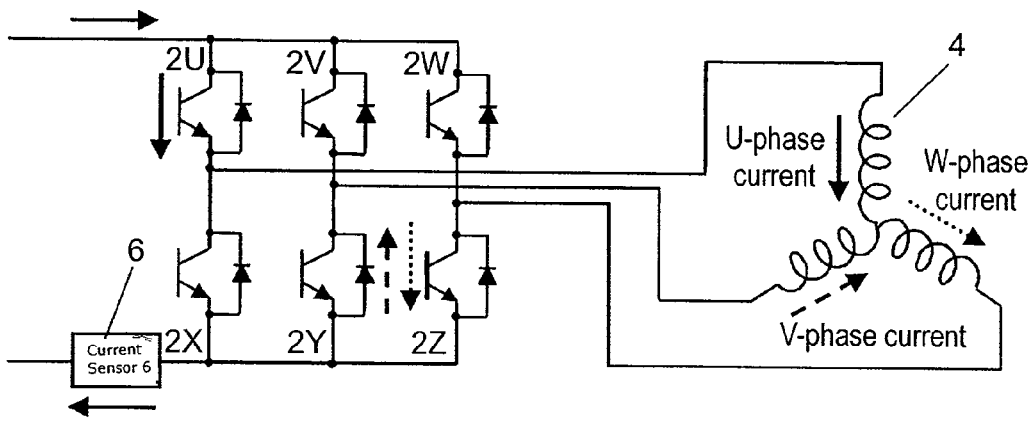
FIG. 5B is an electric circuit diagram showing the current path in period (b) in the three-phase modulation.
Figure 5C:
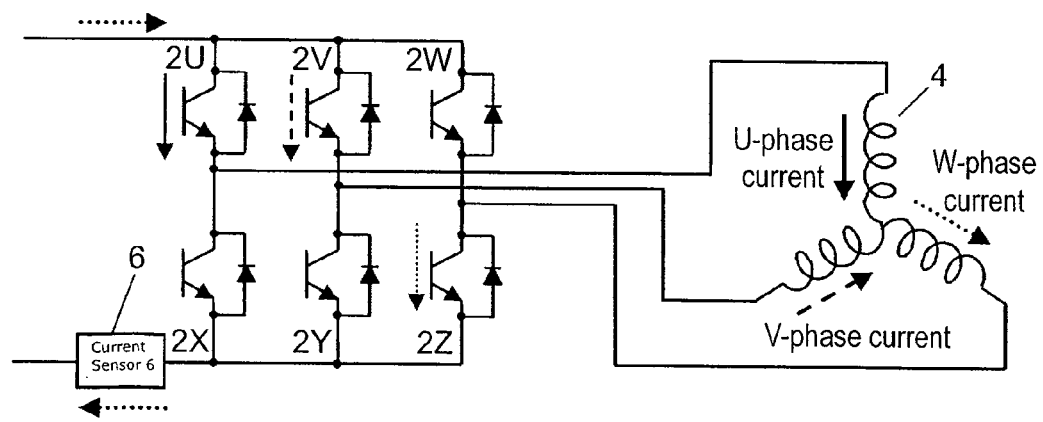
FIG. 5C is an electric circuit diagram showing the current path in period (c) in the three-phase modulation.
Figure 5D:
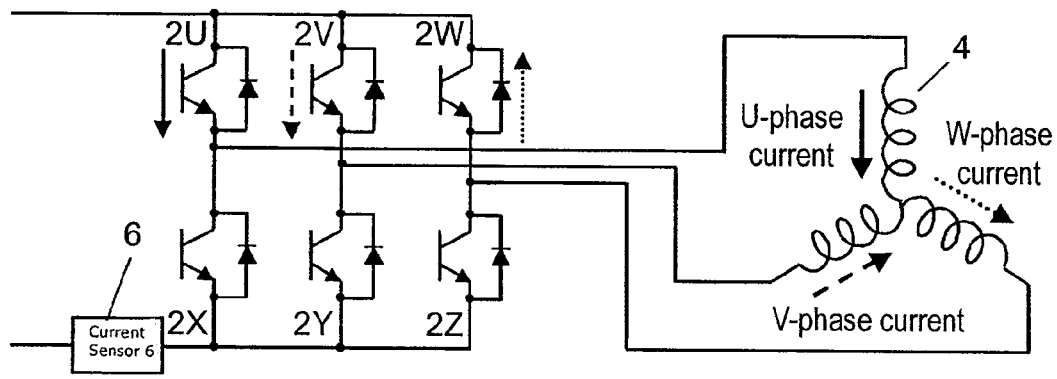
FIG. 5D is an electric circuit diagram showing the current path in period (d) in the three-phase modulation.

FIG. 4 is a timing chart of three-phase modulation, showing an on/off state of the upper-arm switching elements 2U, 2V, 2W and the lower-arm switching elements 2X, 2Y, 2Z in one carrier (a carrier cycle). The timing chart corresponds to the phase of about 120° in the modulation with a maximum modulation degree of 50% shown in FIG. 2.

There are four switching patterns (a), (b), (c) and (d), each of the current paths is shown in the electric circuit diagrams of FIG. 5A through FIG. 5D.

In the period of pattern (a), all of upper-arm switching elements 2U, 2V, 2W are turned off, and all of lower-arm switching elements 2X, 2Y, 2Z are turned on. The U-phase current and the V-phase current flow from the diodes parallel to lower-arm switching elements 2X and 2Y, respectively, to stator winding 4. The W-phase current flows from stator winding 4 to lower-arm switching element 2Z. The current flows between the lower-arm switching elements and motor 11. That is, current is not fed from battery 1 to inverter circuit 10 and motor 11.

In the period of pattern (b), upper-arm switching element 2U and lower-arm switching elements 2Y, 2Z are turned on. In this period, the U-phase current flows from upper-arm switching element 2U to stator winding 4; the V-phase current flows from the diode parallel to lower-arm switching element 2Y to stator winding 4; and the W-phase current flows from stator winding 4 to lower-arm switching element 2Z. That is, the current is fed from battery 1 to inverter circuit 10 and motor 11. In this period, the power supply line (current sensor 6) carries the U-phase current.

In the period of pattern (c), upper-arm switching elements 2U, 2V and lower-arm switching elements 2Z are turned on. In this period, the U-phase current and the V-phase current flow from upper-arm switching elements 2U and 2V, respectively, to stator winding 4; and the W-phase current flows from stator winding 4 to lower-arm switching element 2Z. That is, current is fed from battery 1 to inverter circuit 10 and motor 11. In this period, the power supply line (current sensor 6) carries the W-phase current.

In period (d), all three upper-arm switching elements 2U, 2V, 2W are turned on, whereas all three lower-arm switching elements 2X, 2Y, 2Z are turned off. The U-phase current and the V-phase current flow from upper-arm switching elements 2U and 2V, respectively, to stator winding 4. The W-phase current flows from stator winding 4 to the diode parallel to upper-arm switching element 2W. The current flows between the upper-arm switching elements and motor 11. That is, current is not fed from battery 1 to inverter circuit 10 and motor 11.

The on/off state of upper-arm switching elements 2U, 2V, 2W tells that whether or not the power supply line (current sensor 6) carries current, and which phase of current flows when current is detected. That is, when all three phases are turned off, no current flows (non-conducting state); when only one phase is turned on, the current corresponding to the phase flows (conducting state); when two phases are turned on, the current corresponding to the remaining phase flows (conducting state); and when three phases are all turned on, no current flows (non-conducting state).

Figure 6:
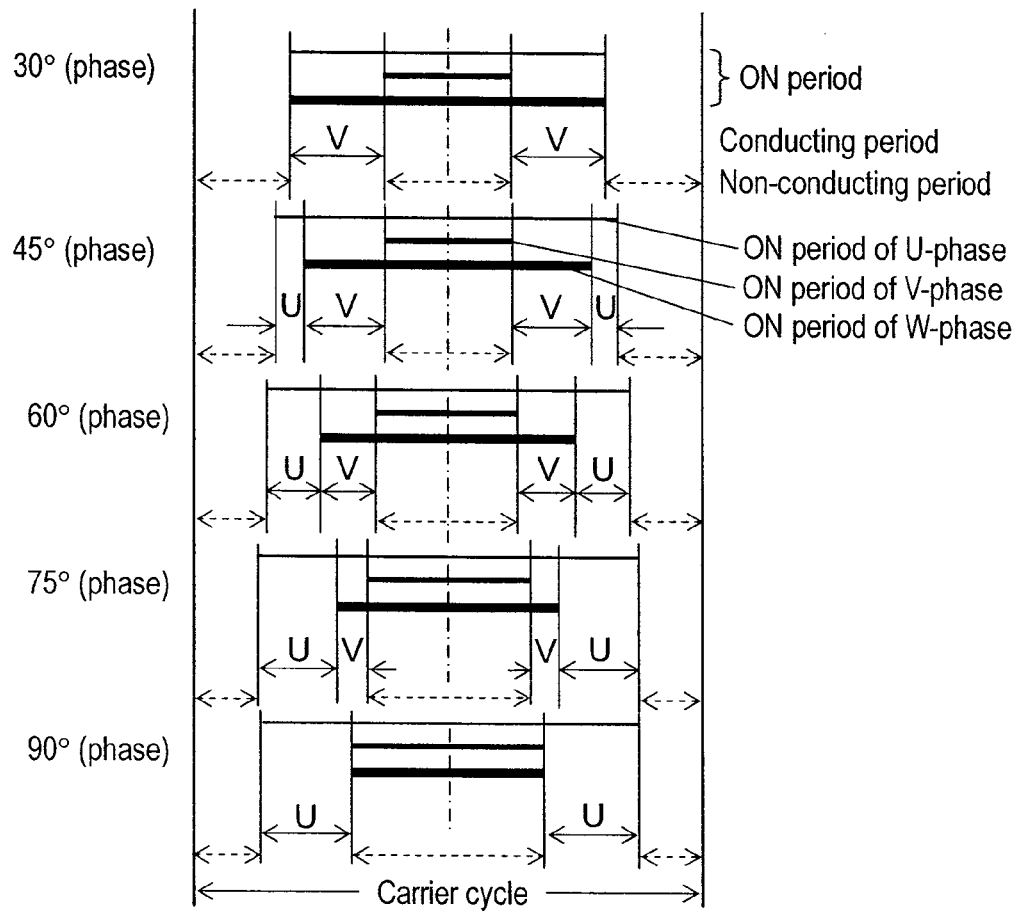
FIG. 6 shows an ON period, a conducting period and a non-conducting period of upper-arm switching elements in each phase in the three-phase modulation with a maximum modulation degree of 50%.

FIG. 6 shows the ON period of upper-arm switching elements 2U, 2V, 2W in one carrier (a carrier cycle) at phases of 30°, 45°, 60°, 75° and 90° in FIG. 2 (i.e., in the three-phase modulation with a maximum modulation degree of 50%). The ON period (duty) of upper-arm switching elements 2U, 2V, 2W is equally shown on the left and right sides from the middle of a carrier cycle.

In the figure, a thin solid line represents the ON period of the U-phase; a medium solid line represents the V-phase; and a thick solid line represents the W-phase. In addition, under the ON period of each phase, a conducting period during which power supply is fed from battery 1 to stator winding 4 is indicated by an arrowed solid line, and the phase current that flows through the power supply line in the period is indicated by capital letters of U, V, W. A non-conducting period is indicated by an arrowed broken line.

Figure 7:
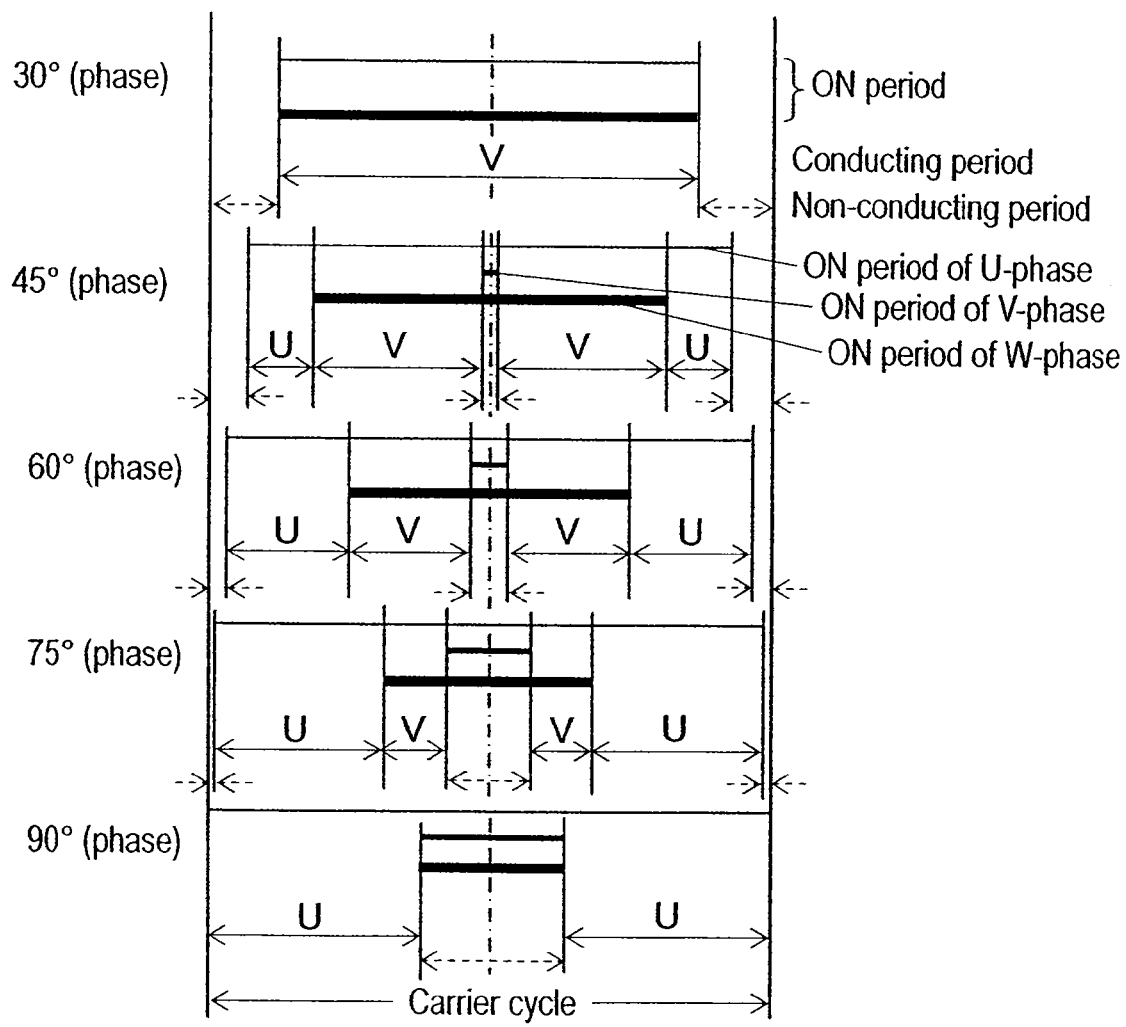
FIG. 7 shows the ON period, the conducting period and the non-conducting period of the upper-arm switching elements in each phase in the three-phase modulation with a maximum modulation degree of 100%.

Similarly, FIG. 7 shows the ON period of the upper-arm switching elements in the three-phase modulation at a maximum modulation degree of 100% shown in FIG. 3. In the three-phase modulation, as shown in FIGS. 6 and 7, period (d) in the middle of a carrier cycle is a non-conducting period. The non-conducting period also appears in the beginning and the end of the carrier cycle. That is, a conducting period appears twice-one is in the first half of the cycle; and the other is in the latter half of the cycle. Compared to the two-phase modulation where the conducting period appears once, the three-phase modulation has a carrier cycle shortened to half, i.e., the carrier frequency is double (hereinafter referred to as a carrier cycle-shortening effect), by which a fine and smooth PWM modulation is obtained. As compared to the two-phase modulation, the three-phase modulation generally exhibits less current ripple and torque ripple, thereby reducing noise and vibration. However, there are some exceptions that can't offer the carrier cycle-shortening effect in the three-phase modulation above. In a carrier cycle at a phase of 30° in the modulation with a maximum modulation degree of 100%, as shown in FIG. 7, the conducting period appears once in the cycle, and therefore the carrier cycle-shortening effect cannot be obtained. Similarly, in a carrier cycle at a phase of 90° in FIG. 7, due to absence of the non-conducting period in the beginning and the end of the carrier cycle, the conducting period is linked with the ones in the previous carrier cycle and the successive cycle. Although a carrier cycle at a phase of 90° contains two conducting periods, it is regarded as one conducting period per carrier cycle. As a result, the carrier cycle-shortening effect cannot be obtained.

As described above, in an inverter device that works on a sine-wave drive system by PWM modulation, in terms of reducing noise and vibration, the three-phase modulation is generally effective, than the two-phase modulation, in providing the carrier cycle-shortening effect. However, in the modulation with a maximum modulation degree of 100%, there are some cases where noise and vibration cannot be reduced to a desired level due to lack of the carrier cycle-shortening effect.

When such an inverter device is employed for driving an electric compressor used for an air conditioning device, in particular, for a room air conditioner, noise can be suppressed by using a soundproof structure, such as a soundproof box. However, when the electric compressor is employed for a vehicle air conditioner, a soundproof structure is unlikely used from constraints on the installation space and weight. It is also difficult to use a vibration isolator for suppressing vibration so as not to transmit it to the interior of a vehicle. As for a room air conditioner, too, there has been a growing demand for reducing vibration and noise as possible in terms of environmental friendliness.

To address the problems above, the inverter device of the present invention makes adjustment in which an ON period is equally added to or subtracted from the ON period of the upper-arm switching elements in all the phases for each carrier cycle of the PWM 3-phase modulation, and then outputs a sinusoidal wave-shaped AC current to the motor. The structure above allows the PWM modulation to remain unchanged, offering the carrier cycle-shortening effect in all the phases. Hereinafter, more specific description will be given in exemplary embodiments.

First Exemplary Embodiment

Figure 8:
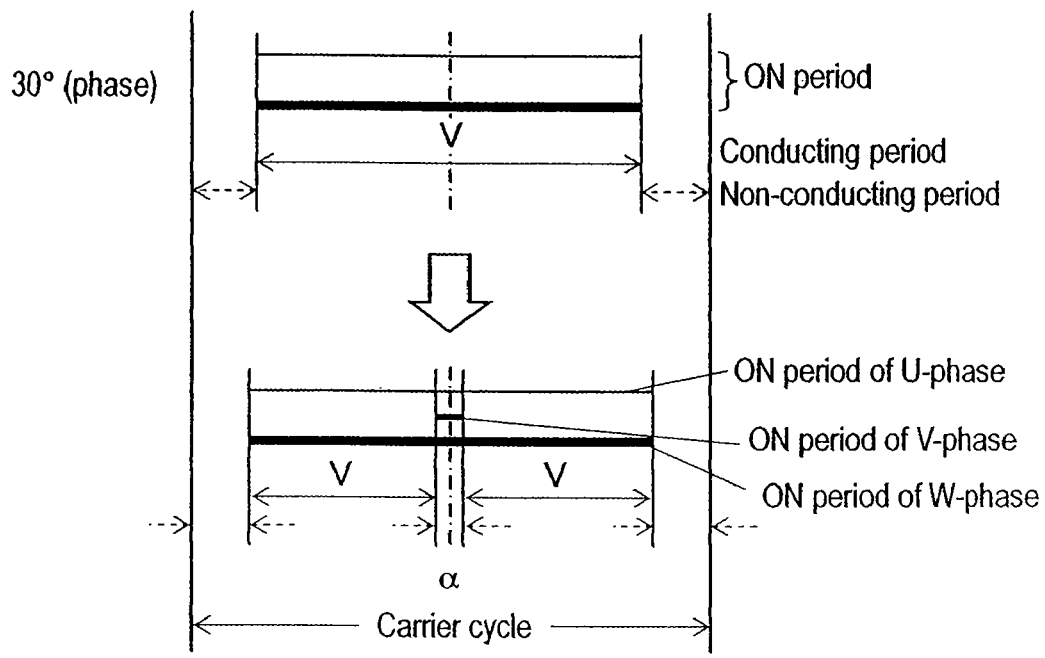
FIG. 8 shows the ON period, the conducting period and the non-conducting period of the upper-arm switching elements in accordance with a first exemplary embodiment of the present invention.

FIG. 8 shows an ON period, a conducting period and a non-conducting period of the upper-arm switching elements in accordance with the first exemplary embodiment of the present invention. The inverter device and the peripheral circuits are shown in FIG. 1.

In the three-phase modulation with a maximum modulation degree of 100% (FIG. 7), the upper-arm switching element of the V-phase has no ON period at a phase of 30°, which causes a single conducting period within a carrier cycle. Therefore, the carrier cycle-shortening effect is not expected.

FIG. 8 shows the solution to the problem above. The upper part of the figure (above the downward-pointing arrow) is the same as that in FIG. 7, that is, the ON period, conducting period and non-conducting period of the upper-arm switching elements at a phase of 30° in the three-phase modulation with a maximum modulation degree of 100%. The lower part (below the arrow) shows the ON period, conducting period and non-conducting period after adjustment.

In the lower part of the figure, ON period a is equally added to upper-arm switching elements 2U, 2W and 2V, so that switching element 2V, which had no ON period before adjustment, has ON period $\alpha$. That is, ON period $\alpha$ is equally added to all the three phases. This allows the upper-arm switching elements of all the U-, V- and W-phases to turn on in the middle of a carrier cycle, forming non-conducting period of time $\alpha$. During the non-conducting period, current flows between the upper-arm switching elements and motor 11. The adjustment above allows the conducting period to appear twice in a carrier cycle, producing the carrier cycle-shortening effect.

The total time of the two conducting periods is obtained by subtracting the non-conducting period (time $\alpha$) from the sum of the pre-adjustment ON period of upper-arm switching elements 2U, 2W and ON period $\alpha$. That is, the total time is equal to the pre-adjustment ON period (i.e., the conducting period before ON period a is added) of upper-arm switching elements 2U, 2W. This means that the PWM modulation operated by the inverter device remains unchanged.

When there is a phase in which the upper-arm switching element has an ON period nearly to zero, specifically, not greater than 5% of the carrier cycle, the inverter device adequately forms a non-conducting period in the middle of a carrier cycle, offering the carrier cycle-shortening effect with consistency.

As described above, when there is a phase in which the upper-arm switching element has an ON period of 0% or almost 0% of the carrier cycle, the adjustment in which an ON period is equally added to all the phases allows the conducting period to appear twice in the carrier cycle, providing the carrier cycle-shortening effect consistently. With the structure above, the inverter device further reduces noise and vibration.

Second Exemplary Embodiment

Figure 9:
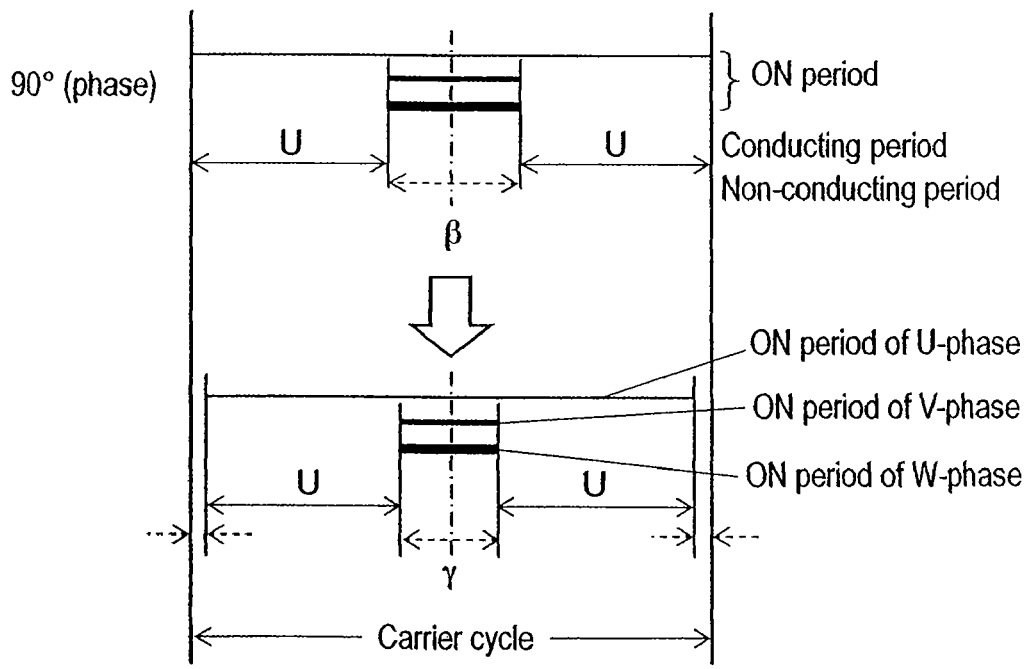
FIG. 9 shows the ON period, the conducting period and the non-conducting period of the upper-arm switching elements in accordance with a second exemplary embodiment of the present invention.

FIG. 9 shows the ON period, the conducting period and the non-conducting period of the upper-arm switching elements in accordance with the second exemplary embodiment of the present invention. In the three-phase modulation with a maximum modulation degree of 100% in FIG. 7, the ON period of the upper-arm switching element of the U-phase accounts for 100% of a carrier cycle, and therefore, the carrier cycle has non-conducting period in the beginning and the end of the cycle. That is, due to the absence of the non-conducting period in the beginning and the end of the carrier cycle, the conducting period is linked with the ones in the previous carrier cycle and the successive cycle. Although the carrier cycle at a phase of 90° contains two conducting periods, it is regarded as one conducting period per carrier cycle. As a result, the carrier cycle-shortening effect cannot be obtained.

FIG. 9 shows the solution to the problem above. The upper part of the figure (above the downward-pointing arrow) is the same as that in FIG. 7, that is, the ON period, conducting period and non-conducting period of the upper-arm switching elements at a phase of 90° in the three-phase modulation with a maximum modulation degree of 100%. In the upper part of FIG. 9, the period shown in the middle of the carrier cycle is non-conducting period $\beta$. During non-conducting period $\beta$, the upper-arm switching elements of all the three phases U, V, W turn on. The lower part (below the arrow) shows the ON period, conducting period and non-conducting period after adjustment. During the non-conducting period represented by γ in the middle of the carrier cycle, the upper-arm switching elements of all the three phases U, V, W turn on. Reducing non-conducting period β to non-conducting period γ allows the carrier cycle to have a non-conducting period in each of the beginning and the end of the carrier cycle. During the non-conducting period, current flows between the lower-arm switching elements and motor 11. The adjustment above allows the conducting period to appear twice in a carrier cycle, producing the carrier cycle-shortening effect.

The conducting period has no difference between the period before adjustment and the period after adjustment, since non-conducting period β where the upper-arm switching elements of all the three phases U, V, W turn on is merely reduced to period γ. This means that the PWM modulation operated by the inverter device remains unchanged.

When there is a phase in which the ON period of the upper-arm switching element accounts for 100%, specifically, not less than 95% of the carrier cycle, the inverter device adequately forms a non-conducting period at each of the beginning and the end of the carrier cycle, offering the carrier cycle-shortening effect with consistency.

As described above, when there is a phase in which the ON period of the upper-arm switching element accounts for 100% or nearly 100%, the adjustment in which an ON period is equally subtracted from all the phases allows the conducting period to appear twice in the carrier cycle, providing the carrier cycle-shortening effect consistently. With the structure above, the inverter device further reduces noise and vibration.

Third Exemplary Embodiment

Figure 10:
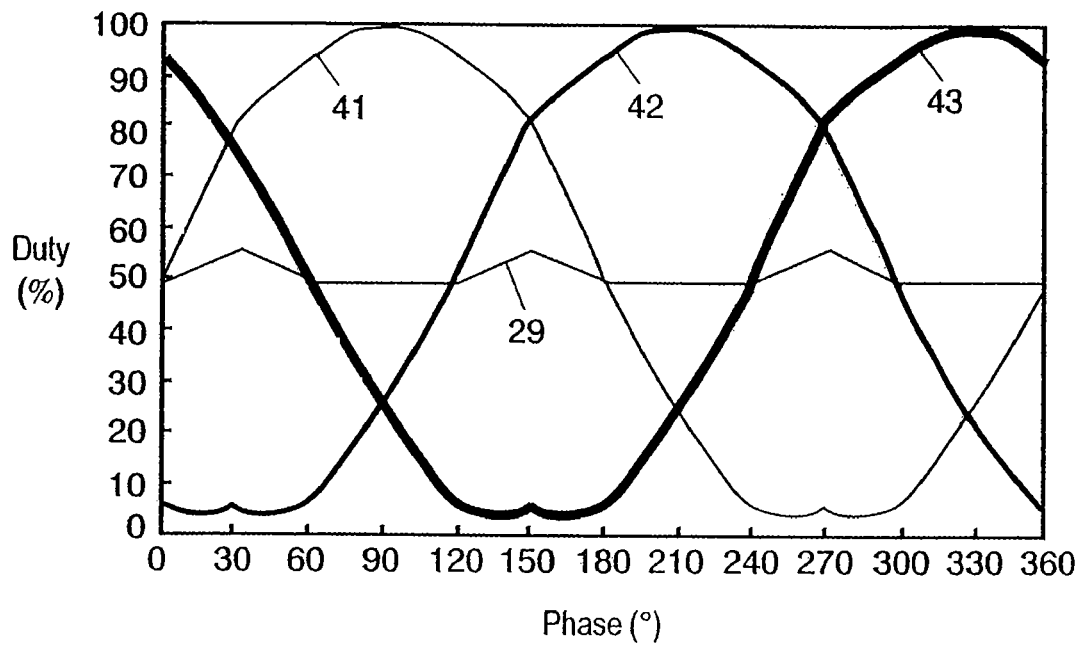
FIG. 10 is a chart showing a waveform characteristic in the three-phase modulation in accordance with a third exemplary embodiment of the present invention.

FIG. 10 is a chart showing the first example of a waveform characteristic in the three-phase modulation in accordance with the third exemplary embodiment of the present invention. As is apparent from the waveforms in FIG. 3, there are phases in which the ON period of the upper-arm switching element accounts for 0% or nearly 0% at ranges of 0°-60°, 120°-180°, and 240°-300°. For the ranges above, in FIG. 10, an ON period to be added is changed according to the phase so as to form a continuous transition without a gap between the adjustment-applied phase and the phase without adjustment. For the range of 0°-60°, the ON period to be added is determined as follows: the value takes zero at 0° and gradually increases to the maximum value at 30° and then gradually decreases to zero at 60°. The adjustment above is applied to the ranges of 120°-180°, and 240°-300° in a like manner.

Like in the first exemplary embodiment, the adjustment above allows the PWM modulation to remain unchanged, offering an inverter device capable of further reducing noise and vibration.

Figure 11:
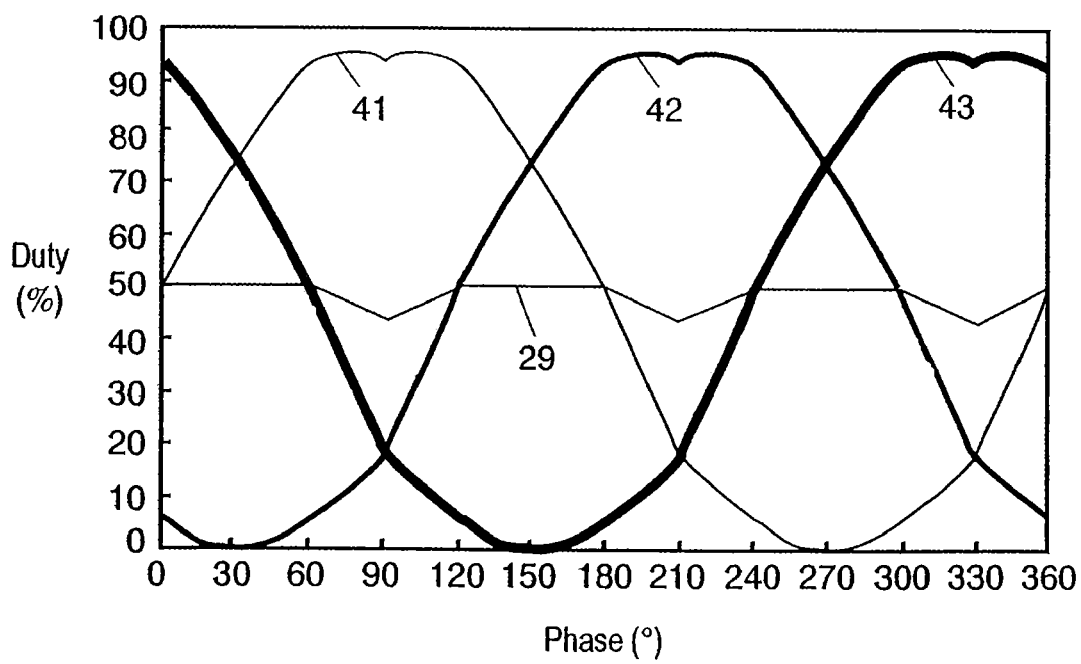
FIG. 11 is a chart showing another waveform characteristic in the three-phase modulation in accordance with the third exemplary embodiment of the present invention.

FIG. 11 is a chart showing the second example of a waveform characteristic in the three-phase modulation in accordance with the third exemplary embodiment of the present invention. As is apparent from the waveforms in FIG. 3, there are phases in which the ON period of the upper-arm switching element accounts for 100% or nearly 100% at ranges of 60°-120°, 180°-240°, and 300°-360°. For the ranges above, in FIG. 11, an ON period to be subtracted is changed according to the phase so as to form a continuous transition without a gap between the adjustment-applied phase and the phase without adjustment. For the range of 60°-120°, the ON period to be subtracted is determined as follows: the value takes zero at 60° and gradually increases to the maximum value at 90° and then gradually decreases to zero at 120°. The adjustment above is applied to the ranges of 180°-240°, and 300°-360° in a like manner.

Like in the second exemplary embodiment, the adjustment above allows the PWM modulation to remain unchanged, offering an inverter device capable of further reducing noise and vibration.

Figure 12:
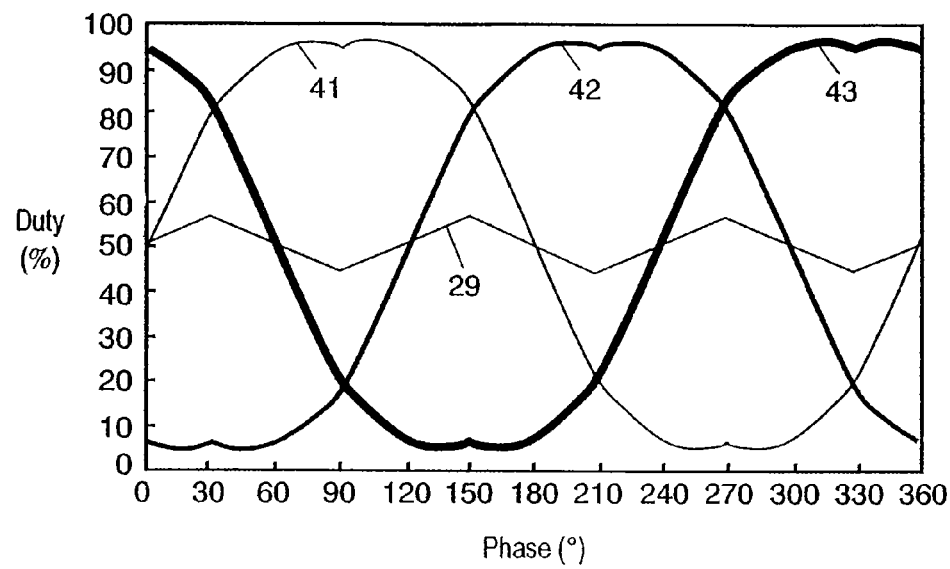
FIG. 12 is a chart showing still another waveform characteristic in the three-phase modulation in accordance with the third exemplary embodiment of the present invention.

FIG. 12 is a chart showing the third example of a waveform characteristic in the three-phase modulation in accordance with the third exemplary embodiment of the present invention. Reflecting FIG. 10 and FIG. 11, FIG. 12 shows the ON periods after adjustment in one chart.

Like in the first and the second exemplary embodiments, the adjustment above allows the PWM modulation to remain unchanged, offering an inverter device capable of further reducing noise and vibration. Besides, the effect is expected in all the phases.

Fourth Exemplary Embodiment

Figure 13:
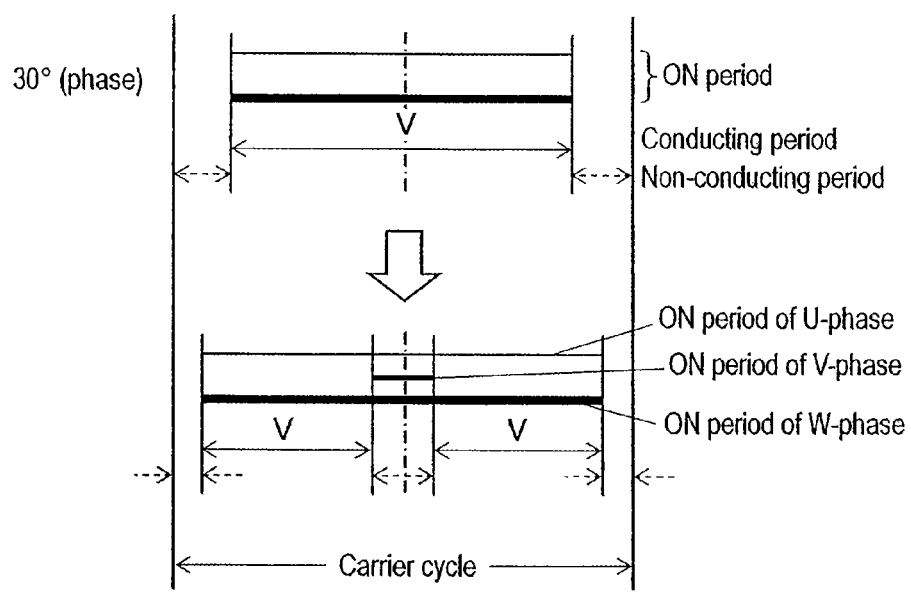
FIG. 13 shows a characteristic of the ON period, conducting period and non-conducting period of the upper-arm switching elements in accordance with a fourth exemplary embodiment of the present invention.

FIG. 13 shows a characteristic of the ON period, conducting period and non-conducting period of the upper-arm switching elements in accordance with the fourth exemplary embodiment of the present invention.

The upper part of FIG. 13 (above the downward-pointing arrow) is the same as that in FIG. 8, that is, the ON period, conducting period and non-conducting period of the upper-arm switching elements at a phase of 30° in the three-phase modulation with a maximum modulation degree of 100%. The lower part (below the arrow) shows the ON period, conducting period and non-conducting period after adjustment.

The adjustment in FIG. 13 differs from that in FIG. 8 in that an ON period is equally added to all the phases so that the non-conducting period in the middle of the carrier cycle (where the upper-arm switching elements of all the three phases U, V, W turn on) is equivalent in length to the non-conducting periods in the beginning and the end of the carrier cycle (where the upper-arm switching elements of all the three phases U, V, W turn off). That is, the ratio of the non-conducting period in the beginning and the non-conducting period in the middle and the non-conducting period in the end is 1:2:1.

Therefore, taking each of the non-conducting periods (where the upper-arm switching elements of all the three phases U, V, W turn off) into account, the conducting period appears at regular intervals (i.e., current is fed with a regular time interval). This enhances the carrier cycle-shortening effect, offering an inverter device capable of further reducing noise and vibration.

Figure 14:
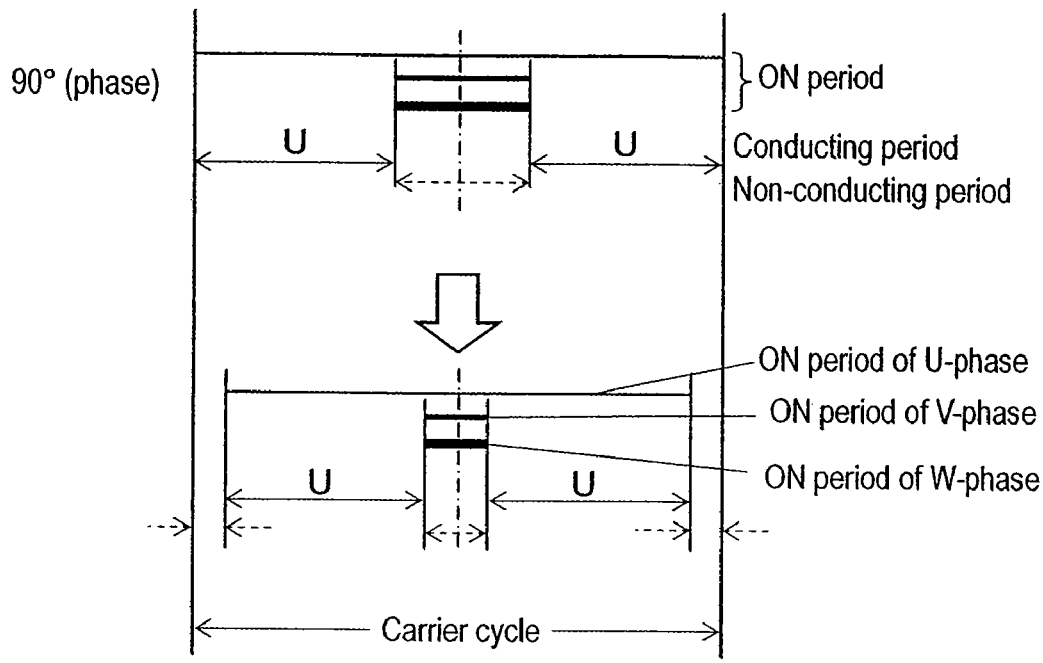
FIG. 14 shows another characteristic of the ON period, conducting period and non-conducting period of the upper-arm switching elements in accordance with the fourth exemplary embodiment of the present invention.

FIG. 14 shows another characteristic of the ON period, conducting period and non-conducting period of the upper-arm switching elements in accordance with the fourth exemplary embodiment of the present invention.

The upper part of FIG. 14 (above the downward-pointing arrow) is the same as that in FIG. 9, that is, the ON period, conducting period and non-conducting period of the upper-arm switching elements at a phase of 90° in the three-phase modulation with a maximum modulation degree of 100%. The lower part (below the arrow) shows the ON period, conducting period and non-conducting period after adjustment.

The adjustment in FIG. 14 differs from that in FIG. 9 in that an ON period is equally subtracted from all the phases so that the non-conducting period in the middle of the carrier cycle (where the upper-arm switching elements of all the three phases U, V, W turn on) is equivalent in length to the non-conducting periods in the beginning and the end of the carrier cycle (where the upper-arm switching elements of all the three phases U, V, W turn off). The adjustment offers the effect the same as that obtained in the adjustment shown in FIG. 13.

Figure 15:
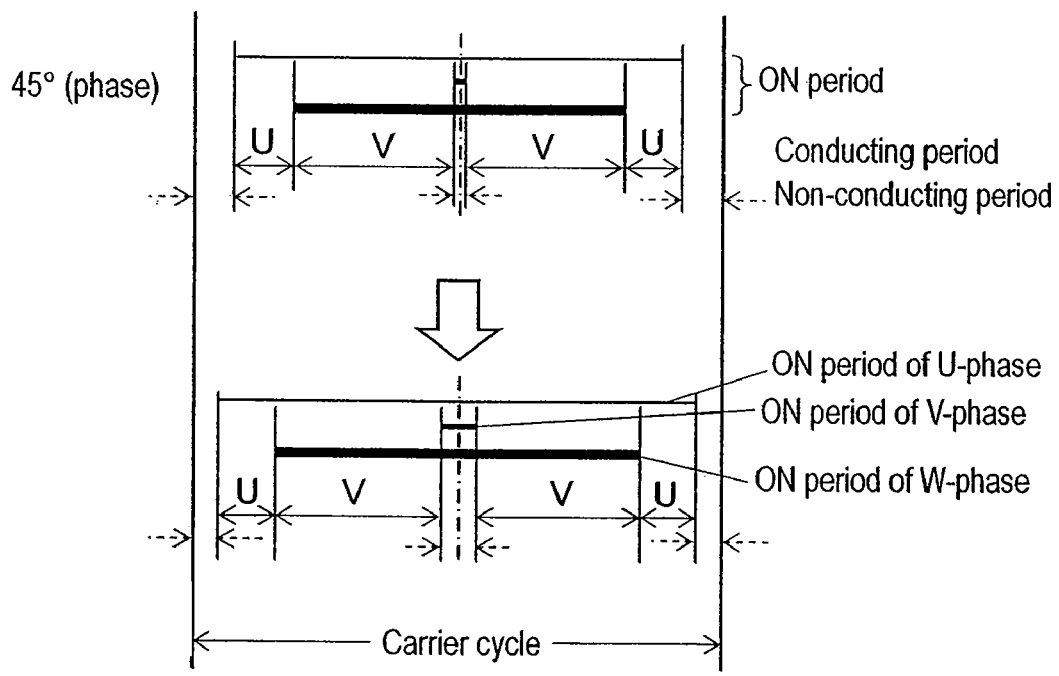
FIG. 15 shows still another characteristic of the ON period, conducting period and non-conducting period of the upper-arm switching elements in accordance with the fourth exemplary embodiment of the present invention.
Figure 16:
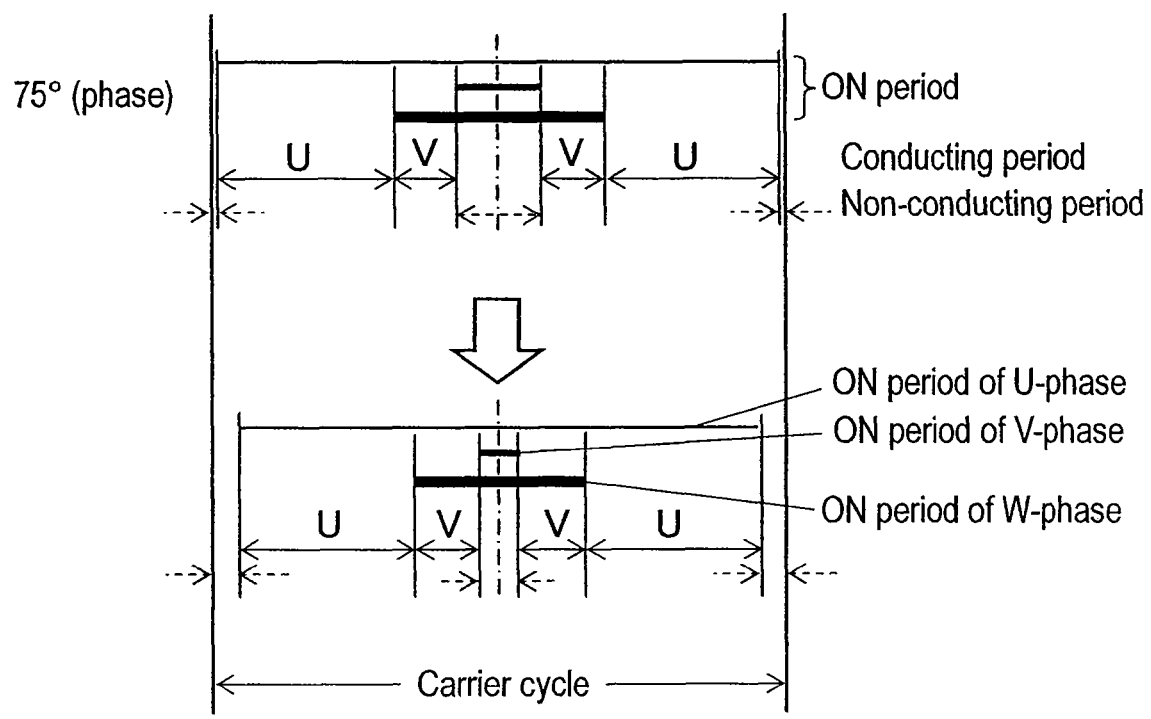
FIG. 16 shows yet another characteristic of the ON period, conducting period and non-conducting period of the upper-arm switching elements in accordance with the fourth exemplary embodiment of the present invention.

Similarly, FIG. 15 illustrates the adjustment (at a phase of 45° in the three-phase modulation with a maximum modulation degree of 100%), in which an ON period is equally added to all the phases so that the non-conducting period in the middle of the carrier cycle (where the upper-arm switching elements of all the three phases U, V, W turn on) is equivalent in length to the non-conducting periods in the beginning and the end of the carrier cycle (where the upper-arm switching elements of all the three phases U, V, W turn off). FIG. 16 illustrates the adjustment (at a phase of 75° in the three-phase modulation with a maximum modulation degree of 100%), in which an ON period is equally subtracted from all the phases. The adjustments shown in FIGS. 15 and 16 are also effective as those shown in FIGS. 13 and 14. Besides, the adjustments above allows the PWM modulation to remain unchanged, as are so the adjustments in FIGS. 13 and 14.

Figure 17:
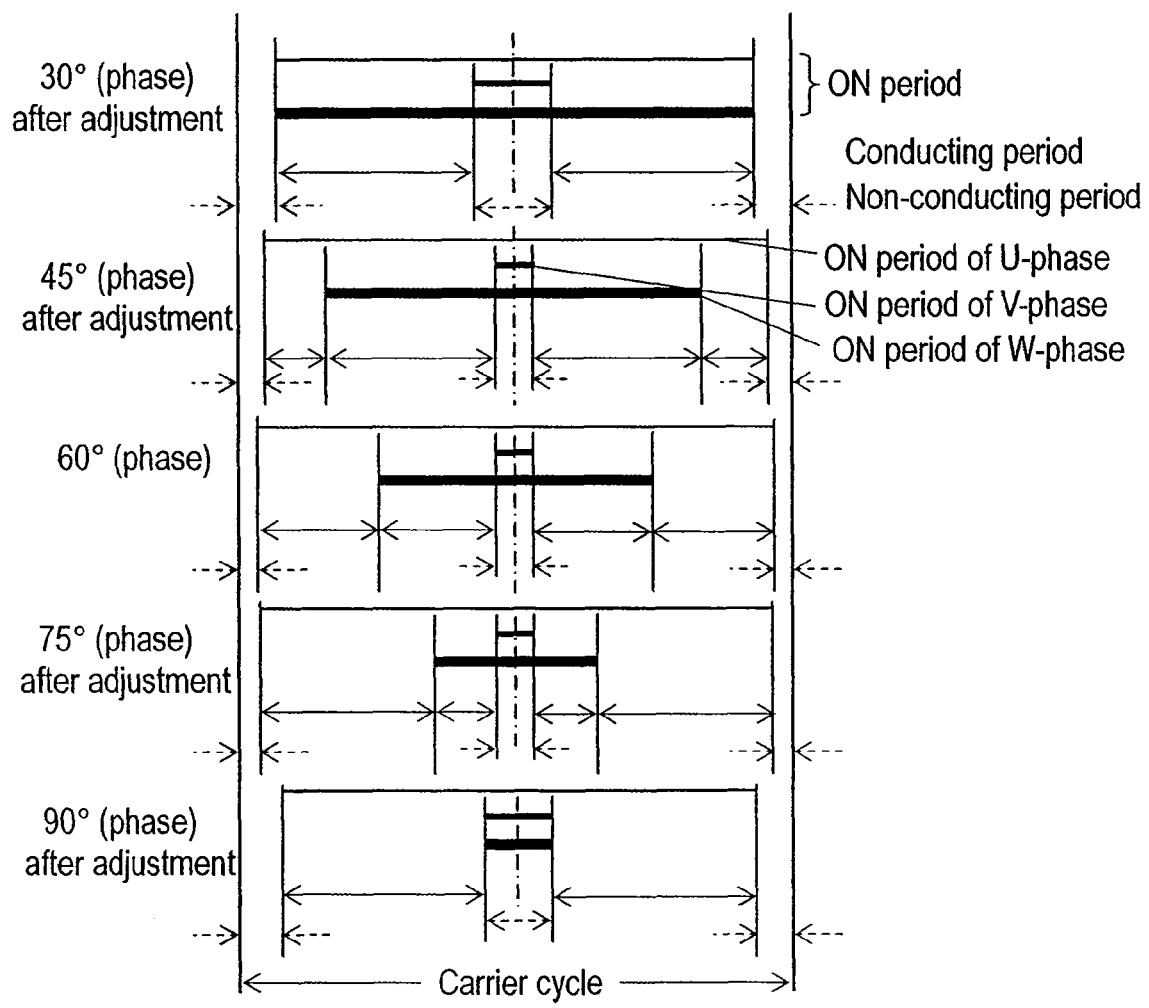
FIG. 17 shows another characteristic of the ON period, conducting period and non-conducting period of the upper-arm switching elements in accordance with the fourth exemplary embodiment of the present invention.

FIG. 17 shows in one chart the ON period of the upper-arm switching elements, the conducting period and non-conducting period after adjustment shown in FIG. 13 through FIG. 16.

In FIG. 17, as for the case of 60°, there is no need to apply adjustment, since the non-conducting period in the middle of the carrier cycle (where the upper-arm switching elements of all the three phases U, V, W turn on) is equivalent in length to the non-conducting periods in the beginning and the end of the carrier cycle (where the upper-arm switching elements of all the three phases U, V, W turn off).

Taking the phases of 30° to 90° as an example here is that the adjustment provided for the range above forms a pattern; the pattern is repeatedly applied to complete the adjustment for all the phases.

Figure 18:
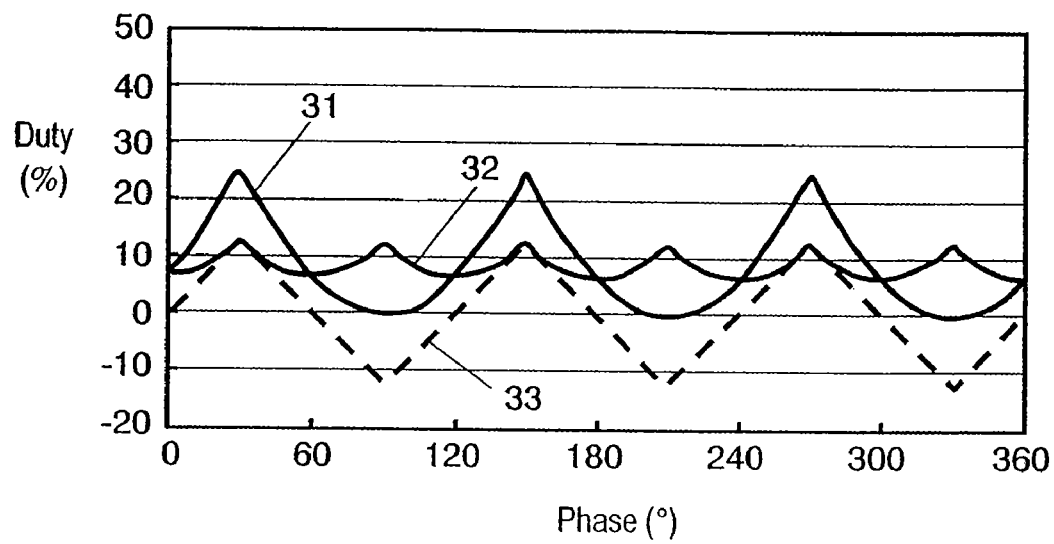
FIG. 18 shows ON-period tolerance in a carrier cycle, an adjustment amount and ON-period tolerance after adjustment in accordance with the fourth exemplary embodiment of the present invention.

FIG. 18 shows values required to the adjustment by phase shown in FIG. 7 through FIG. 17. ON-period tolerance 31 in a carrier cycle shows the ON period that can be equally added to the ON period of the upper-arm switching elements in a carrier cycle (i.e., the ON period to be added when any one of the upper-arm switching elements has an ON period equivalent to the carrier cycle). ON-period tolerance 31 therefore takes the maximum at a phase of 30°, and takes the minimum at a phase of 90°.

Adjustment amount 33 represents the amount to be equally added to or equally subtracted from all the phases so that the non-conducting period in the middle of the carrier cycle (where the upper-arm switching elements of all the three phases U, V, W turn on) is equivalent in length to the non-conducting periods in the beginning and the end of the carrier cycle (where the upper-arm switching elements of all the three phases U, V, W turn off). Adjustment amount 33 in plus range means an amount to be added, whereas adjustment amount 33 in minus range means an amount to be subtracted. As described earlier, there is no need of adjustment amount 33 at a phase of 60°.

ON-period tolerance 32 after adjustment shows difference between the carrier cycle and maximum ON period of the upper-arm switching element in the U, V, W phases in FIG. 17. FIG. 17 shows each phase after adjustment with application of adjustment amount 33 to the phases shown in FIG. 7. ON-period tolerance 32 takes the maximum at phases of 30°, 90°, and takes the minimum at a phase of 60°.

Fifth Exemplary Embodiment

Figure 19:
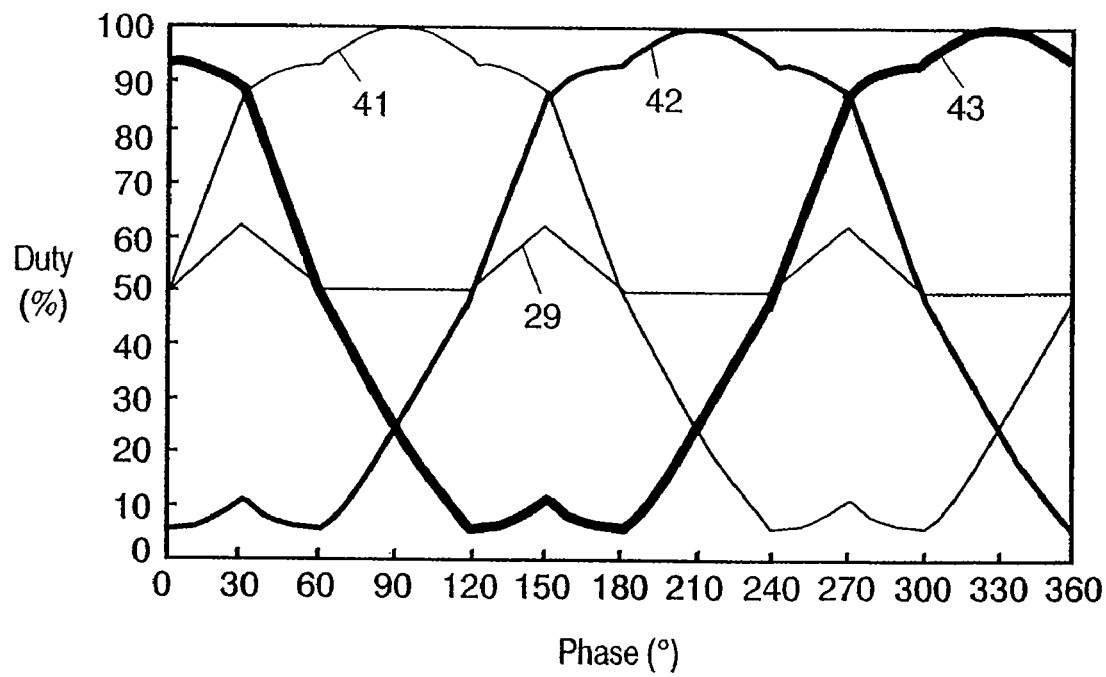
FIG. 19 is a chart showing a waveform characteristic in the three-phase modulation in accordance with a fifth exemplary embodiment of the present invention.

FIG. 19 is a chart showing the first example of a waveform characteristic in the three-phase modulation in accordance with the fifth exemplary embodiment of the present invention. As is apparent from the waveforms in FIG. 3, there are phases in which the ON period of the upper-arm switching element accounts for 0% or nearly 0% at ranges of 0°-60°, 120°-180°, and 240°-300°. For the ranges above, adjustment amount 33 in FIG. 18 is applied. Adjustment amount 33 to be added takes zero at phases of 0° and 60°, so that no gap occurs between the adjustment-applied phase and the phase without adjustment. As for the ranges of 180°-240° and 300°-360°, no gap occurs.

Like in the fourth exemplary embodiment, the adjustment above allows the PWM modulation to remain unchanged, enhancing the carrier cycle-shortening effect. As a result, the inverter device further reduces noise and vibration.

Figure 20:
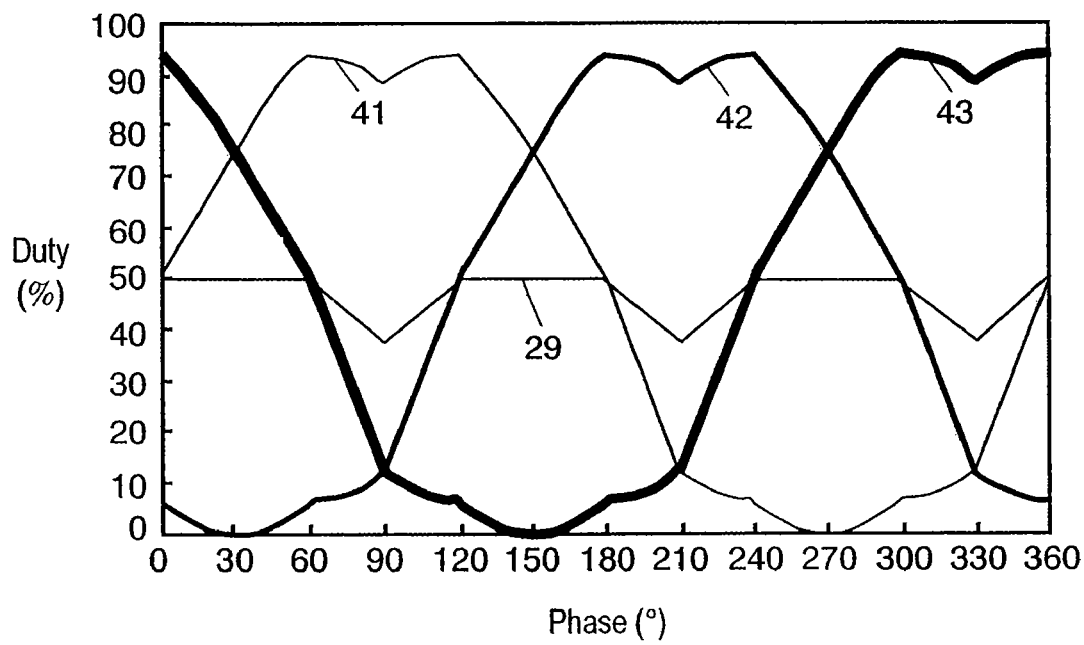
FIG. 20 is a chart showing another waveform characteristic in the three-phase modulation in accordance with the fifth exemplary embodiment of the present invention.

FIG. 20 is a chart showing the second example of a waveform characteristic in the three-phase modulation in accordance with the fifth exemplary embodiment of the present invention. As is apparent from the waveforms in FIG. 3, there are phases in which the ON period of the upper-arm switching element accounts for 100% or nearly 100% at ranges of 60°-120°, 180°-240°, and 300°-360°. For the ranges above, adjustment amount 33 in FIG. 18 is applied. Adjustment amount 33 to be subtracted takes zero at phases of 60° and 120°, so that no gap occurs between the adjustment-applied phase and the phase without adjustment. As for the ranges of 180°-240° and 300°-360°, no gap occurs.

Like in the fourth exemplary embodiment, the adjustment above allows the PWM modulation to remain unchanged, enhancing the carrier cycle-shortening effect. As a result, the inverter device further reduces noise and vibration.

Figure 21:
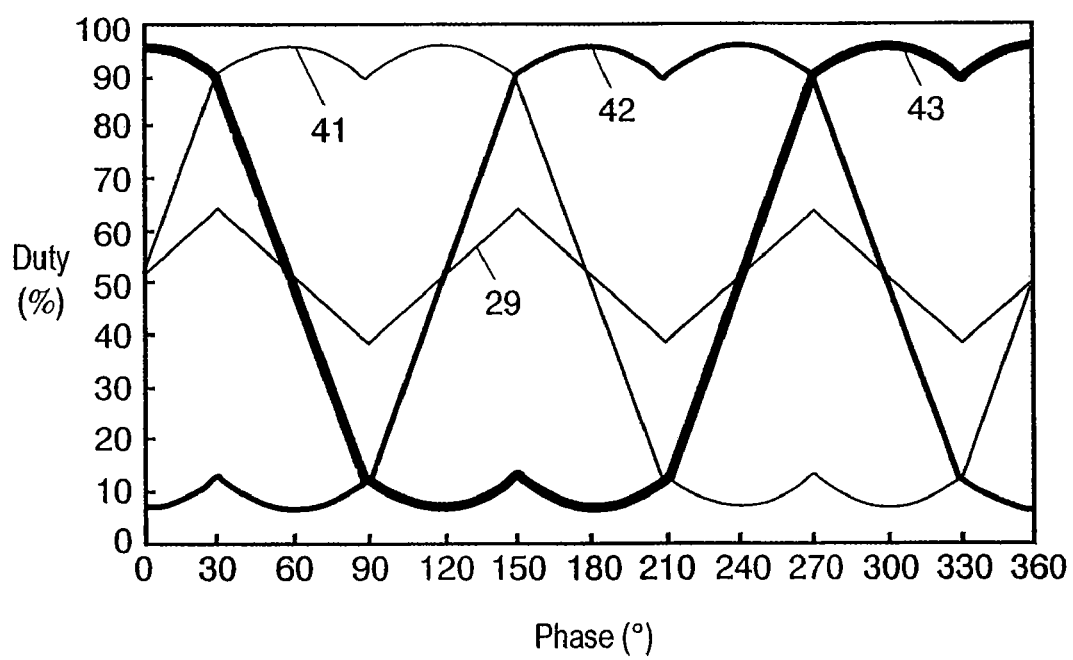
FIG. 21 is a chart showing still another waveform characteristic in the three-phase modulation in accordance with the fifth exemplary embodiment of the present invention.

FIG. 21 is a chart showing the third example of a waveform characteristic in the three-phase modulation in accordance with the fifth exemplary embodiment of the present invention. FIG. 21 shows each phase after adjustment with application of adjustment amount 33 in FIG. 18 to all the phases shown in FIG. 3.

Like in the fourth exemplary embodiment, the adjustment above allows the PWM modulation to remain unchanged, enhancing the carrier cycle-shortening effect. As a result, the inverter device further reduces noise and vibration. Besides, the effect is expected in all the phases.

Sixth Exemplary Embodiment

The first through the fifth embodiments above have described the modulation with a maximum modulation degree of 100%. The sixth embodiment describes modulation with a maximum modulation degree of less than 100%. Here in the embodiment, ON-period tolerance 31 in a carrier cycle, adjustment amount 33 and ON-period tolerance 32 after adjustment shown in FIG. 18 will be represented by expressions below. Taking the phases of 30° through 90° as an example, the expressions define them. The V-phase takes −120° with respect to the U-phase as a reference. In the expressions, $\theta$ represents the phase; $\delta$ represents the modulation degree (that is, $\delta$ takes 1 for modulation degree of 100%; and it takes 0 for modulation degree of 0%).

ON-period tolerance 31 in a carrier cycle is defined as a difference between the U-phase and the ON period (duty) of 100%, and is therefore represented by expression (1) below. This also shows the period during which the upper-arm switching elements of all the three phases turn off.

$$0.5 - 0.5\delta \sin\theta \qquad \text{expression (1)}$$

When the upper-arm switching elements of all the three phases turn on, ON-period tolerance 31 equals to the ON-period (duty) of the upper-arm switching element of the V-phase. In this case, tolerance 31 is obtained by expression (2) below:

$$0.5\delta \sin(\theta - 120) + 0.5 \qquad \text{expression (2).}$$

Suppose that the adjustment is applied in such a way—as is in the fourth exemplary embodiment—that the non-conducting period in the middle of a carrier cycle (where the upper-arm switching elements of all the three phases U, V, W turn on) is equivalent to the non-conducting period in the beginning and the end of the carrier cycle (where the upper-arm switching elements of all the three phases U, V, W turn off). In this case, ON-period tolerance 32 after adjustment equals to the average of the non-conducting period in the middle of the carrier cycle and the non-conducting period in the beginning and the end of the cycle. That is, tolerance 32 is obtained by dividing the sum of expression (1) and expression (2) by 2. Expression (3) below is derived from the calculation result processed by addition theorem.

$$-\frac{3}{8}\delta\sin\theta - \frac{\sqrt{3}}{8}\delta\cos\theta + 0.5. \qquad \text{expression (3)}$$

Adjustment amount 33 equals to the difference between ON-period tolerance 31 in a carrier cycle (=expression (1)) and ON-period tolerance 32 after adjustment (=expression (3)). That is, it is represented by expression (4) below:

$$-\frac{1}{8}\delta\sin\theta + \frac{\sqrt{3}}{8}\delta\cos\theta. \qquad \text{expression (4)}$$

That is, when the adjustment is applied in such a way—as is in the fourth exemplary embodiment—that the non-conducting period in the middle of a carrier cycle (where the upper-arm switching elements of all the three phases U, V, W turn on) is equivalent to the non-conducting period in the beginning and the end of the carrier cycle (where the upper-arm switching elements of all the three phases U, V, W turn off), adjustment amount 33 is represented by expression (4). As is apparent from expression (4) with δ as a factor, adjustment amount 33 varies in proportion to modulation degree δ (where, δ takes 1 for modulation degree of 100%; and it takes 0 for modulation degree of 0%).

The calculation results above tell that the ON period, which is to be equally added to or to be equally subtracted from the phases, should be increased as the PWM 3-phase modulation takes a higher modulation degree. Through the adjustment, a proper ON period (OFF period) can be determined according to the modulation degree. As a result, the adjustment enhances the carrier cycle-shortening effect in all the phases, providing an inverter device capable of further reducing noise and vibration.

Although the embodiments above have introduced descriptions from the aspect of the ON period of the upper-arm switching elements, it is not limited thereto; the descriptions can be given from the aspect of the OFF period of the upper-arm switching elements, and the ON (OFF) period of the lower-arm switching elements. In addition, instead of a sensorless DC brushless motor that is employed in the embodiments, an induction motor is also applicable.

Besides, the device of the present invention is applicable to a structure having a position sensor, a structure having a plurality of current sensors for position sensing, or the like. As a practical use, the conventional three-phase modulation (as a standard mode) and the three-phase modulation of the present invention (as a silence mode) can be switched according to circumstances. The three-phase modulation of the invention, as shown in FIGS. 17 and 18, ON-period tolerance 32 after adjustment takes 6.7% (for example, at a phase of 60°). Setting the minimum value of ON-period tolerance 32 after adjustment to 0% increases output by 7% (=1/(100%−6.7%)), provided that the carrier cycle shortening effect can be traded off for maximum output.

Seventh Exemplary Embodiment

Figure 22:
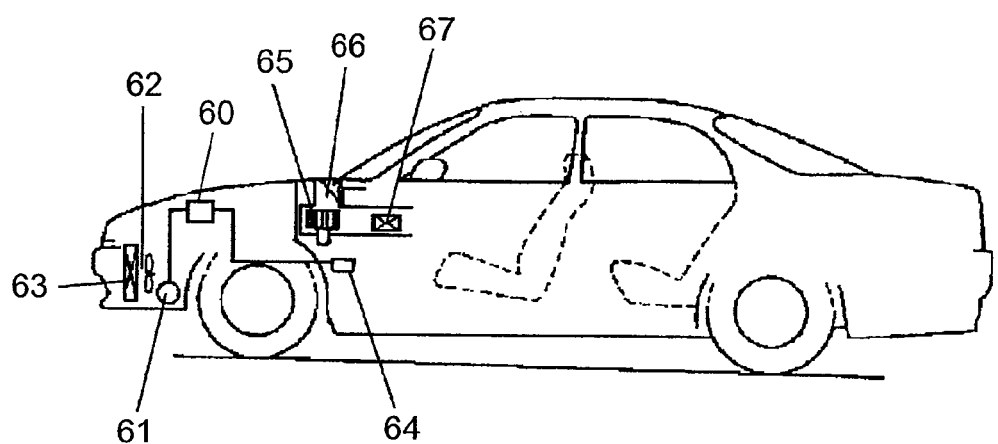
FIG. 22 shows an example in which the inverter device is employed for a vehicle in accordance with a seventh exemplary embodiment of the present invention.
Figure 23:
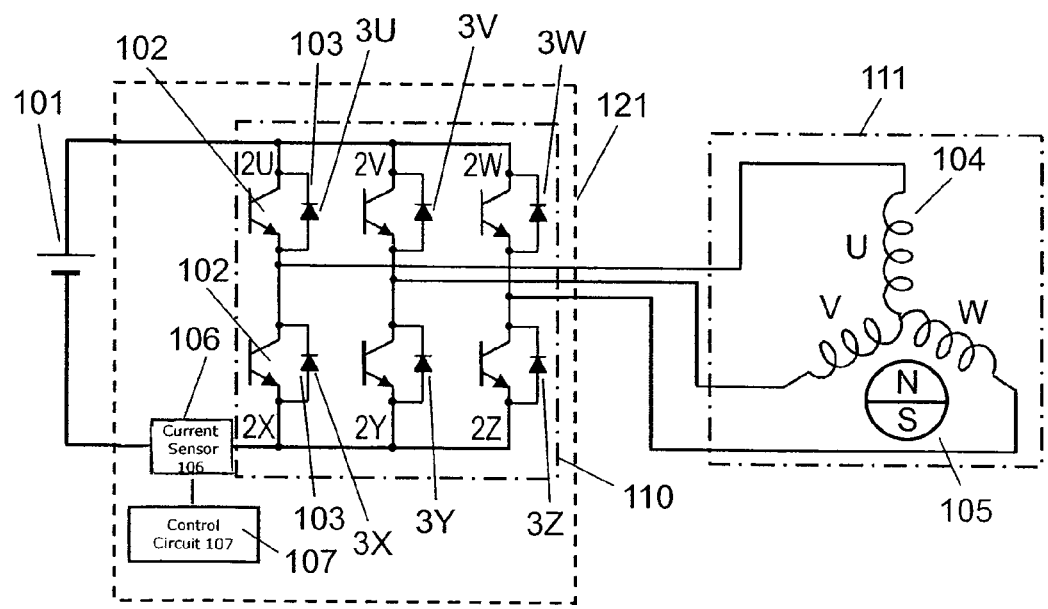
FIG. 23 is an electric circuit diagram of a conventional inverter device.
Figure 24:
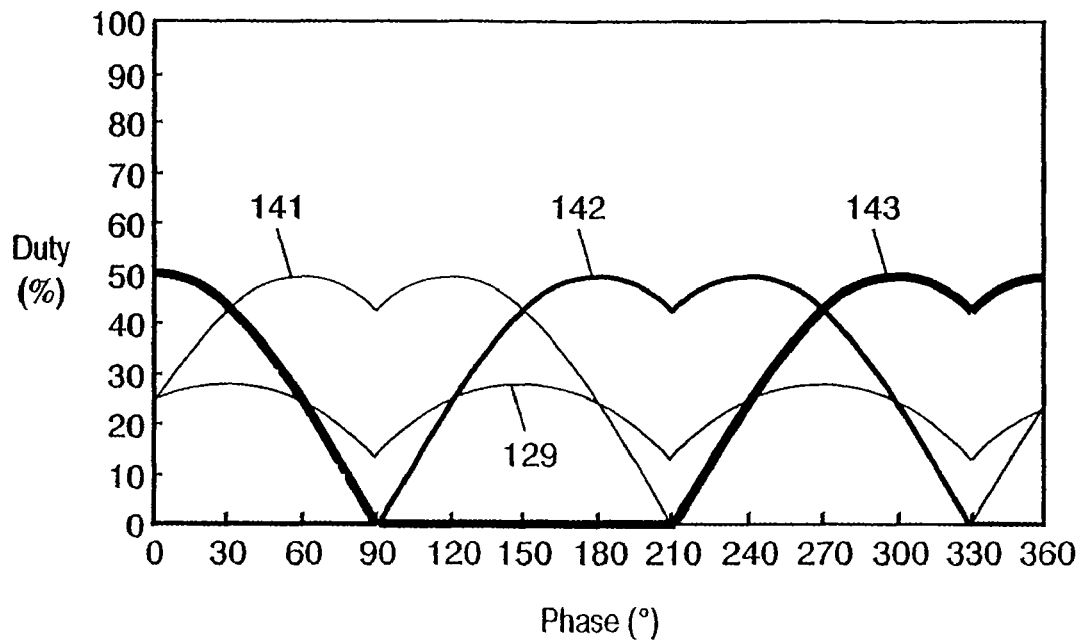
FIG. 24 shows modulated waveforms in each phase in conventional two-phase modulation with a maximum modulation degree of 50%.
Figure 25:
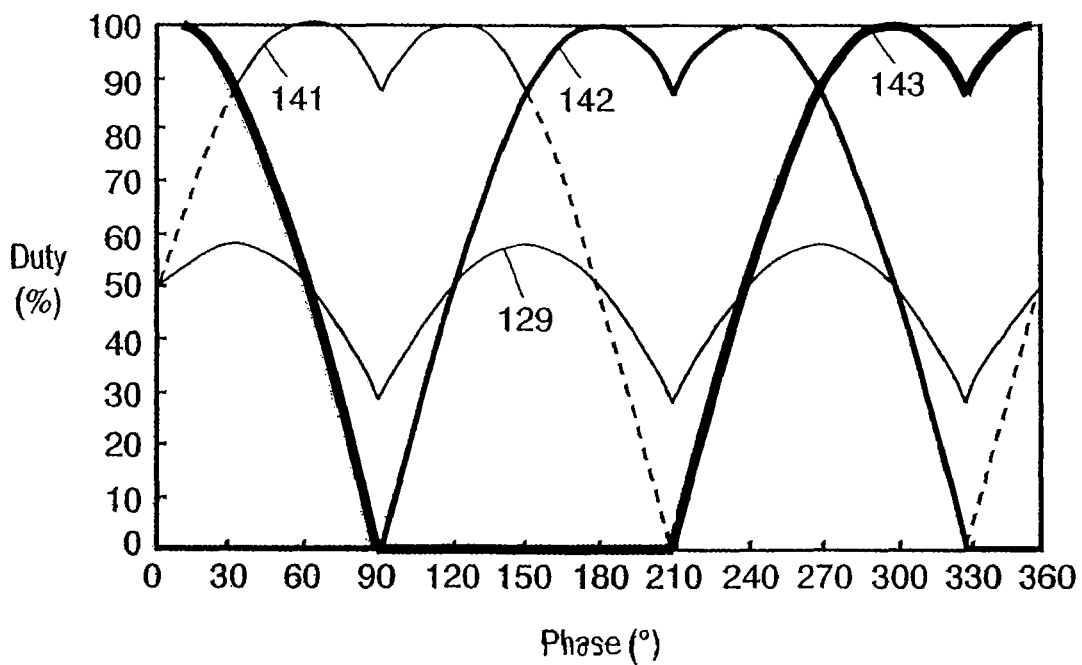
FIG. 25 shows modulated waveforms in each phase in conventional two-phase modulation with a maximum modulation degree of 100%.
Figure 26:
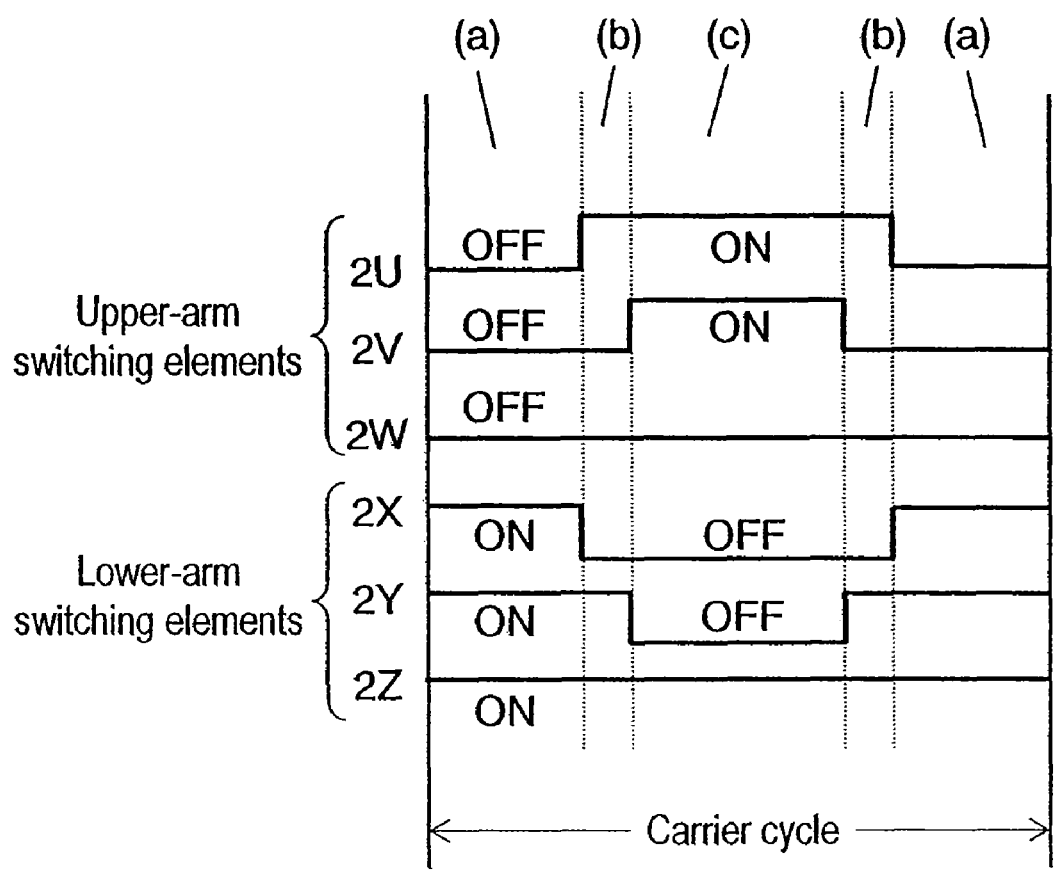
FIG. 26 is a timing chart of the conventional two-phase modulation.
Figure 27A:
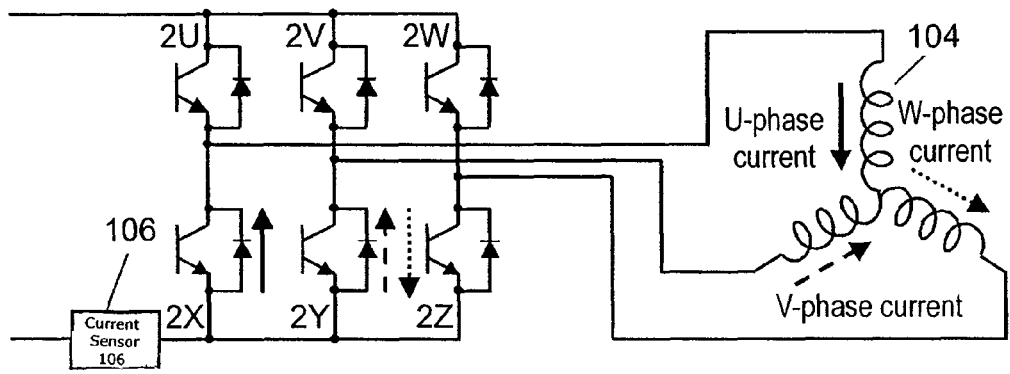
FIG. 27A is an electric circuit diagram showing the current path in period (a) in the conventional two-phase modulation.
Figure 27B:
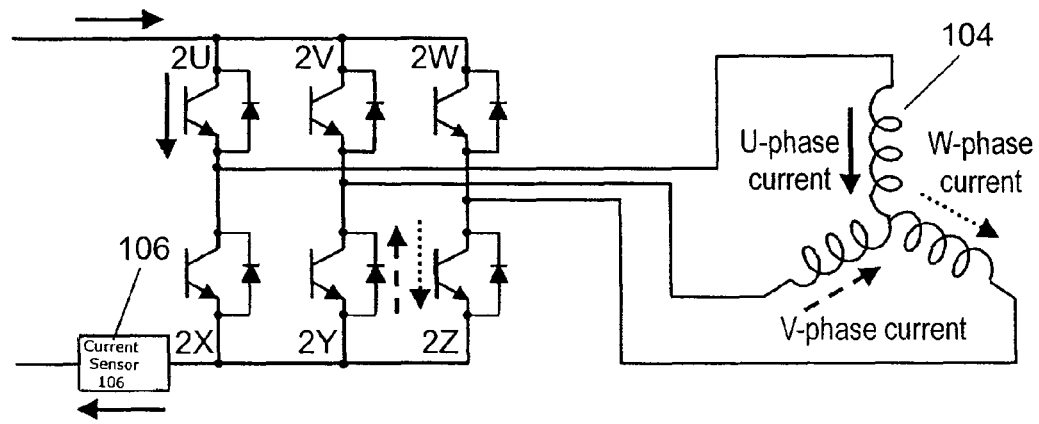
FIG. 27B is an electric circuit diagram showing the current path in period (b) in the conventional two-phase modulation.
Figure 27C:
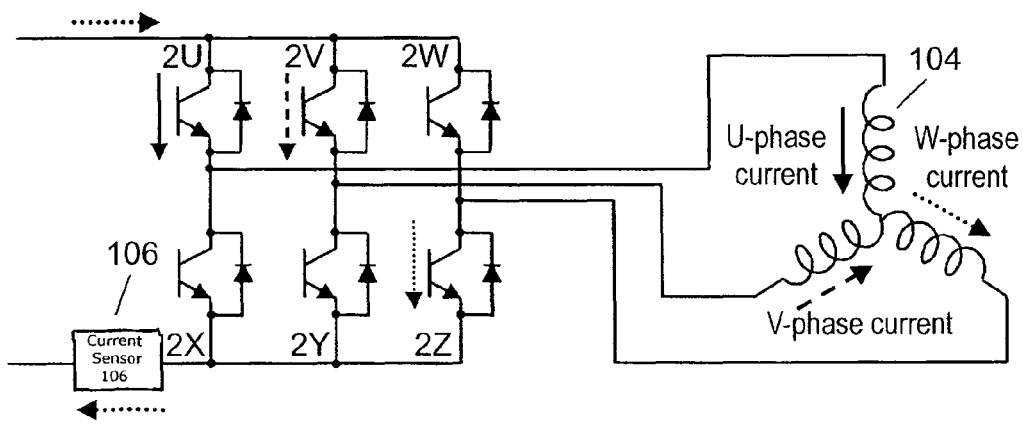
FIG. 27C is an electric circuit diagram showing the current path in period (c) in the conventional two-phase modulation.
Figure 28:
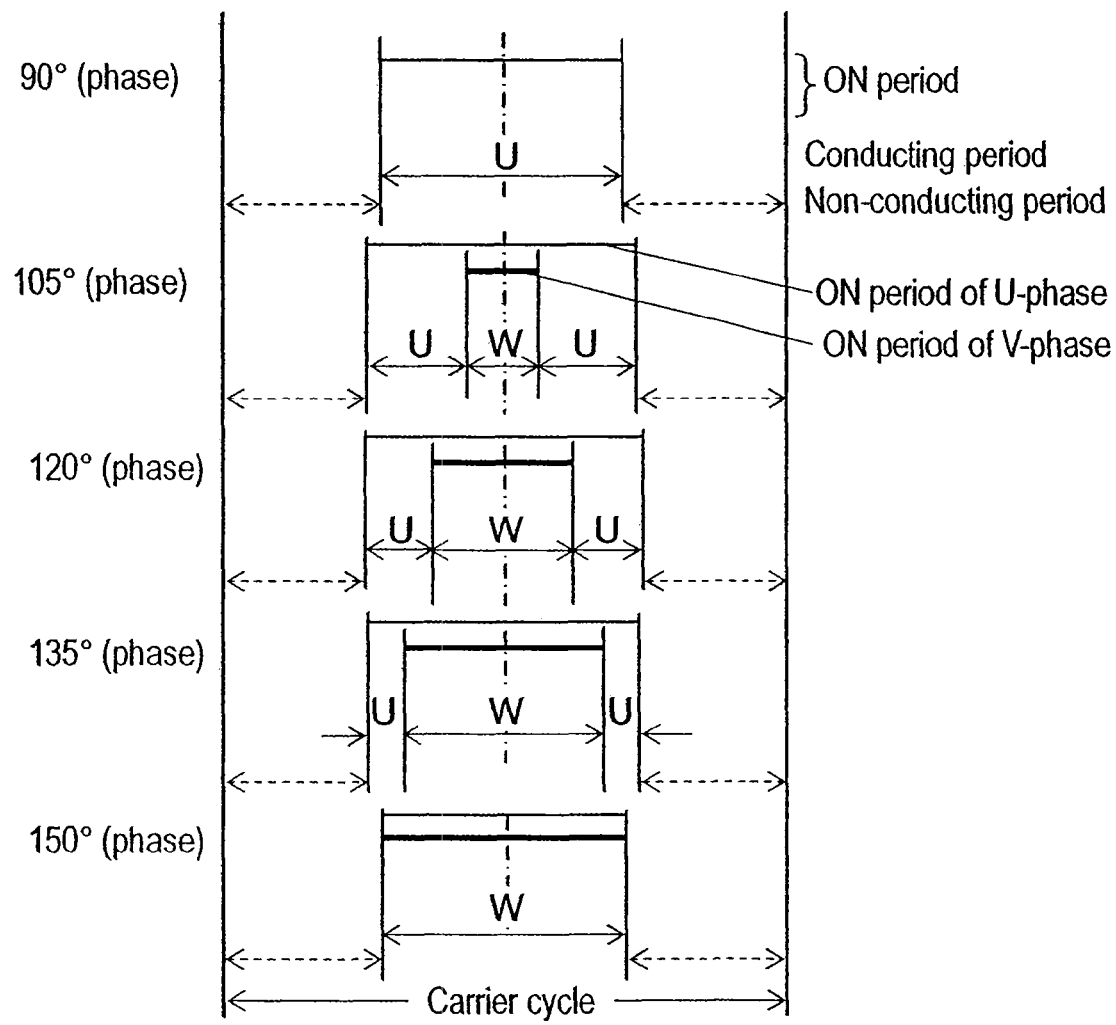
FIG. 28 shows an ON period, a conducting period and a non-conducting period of upper-arm switching elements in each phase in the conventional two-phase modulation with a maximum modulation degree of 50%.
Figure 29:
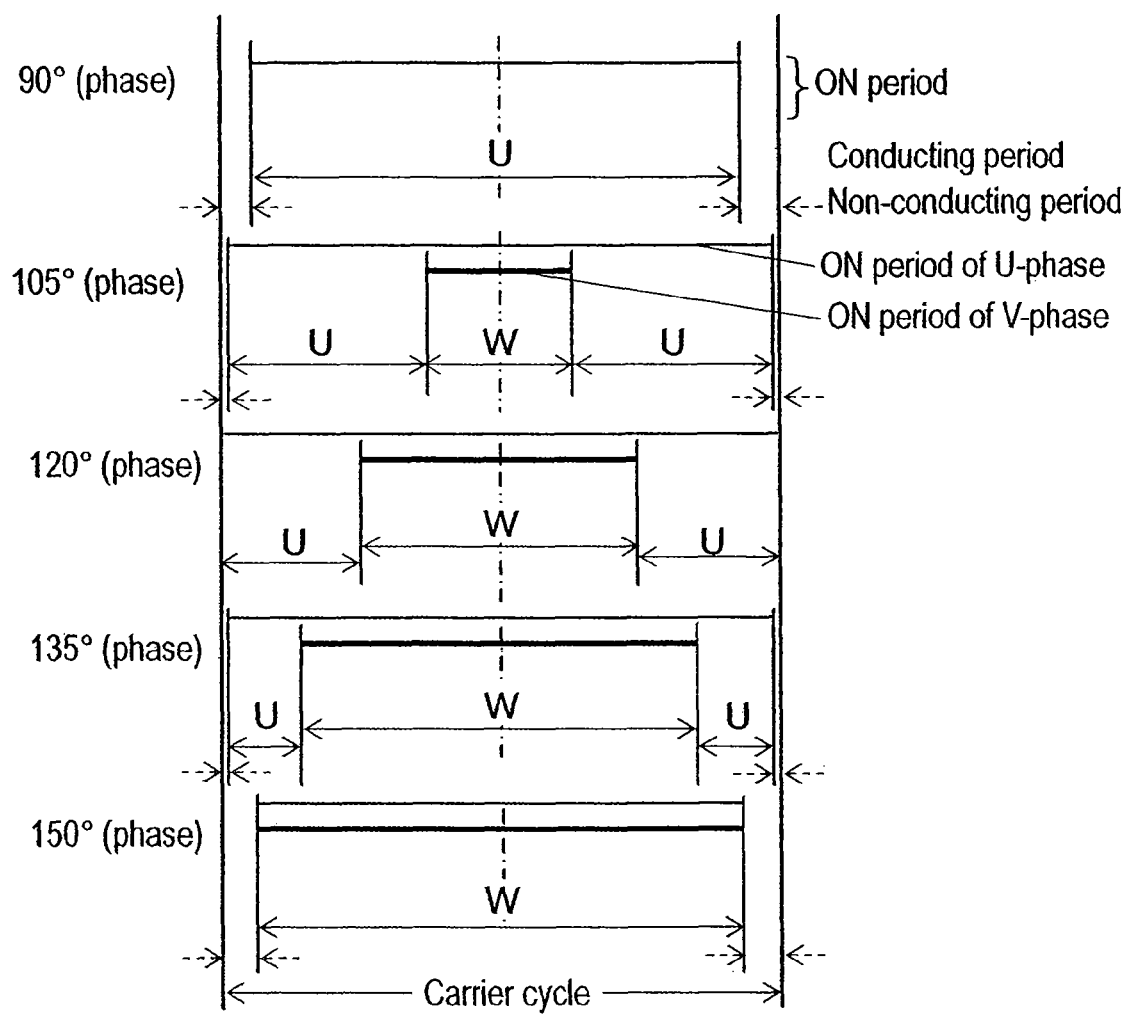
FIG. 29 shows the ON period, the conducting period and the non-conducting period of the upper-arm switching elements in each phase in the conventional two-phase modulation with a maximum modulation degree of 100%.
Figure 30:
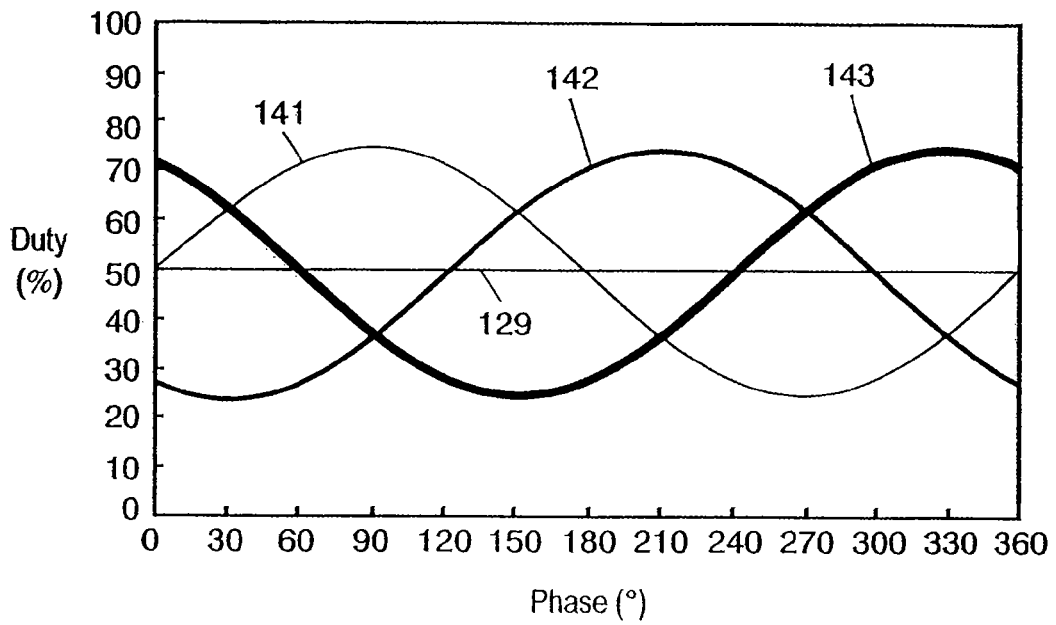
FIG. 30 shows modulated waveforms in each phase in the conventional three-phase modulation with a maximum modulation degree of 50%.
Figure 31:
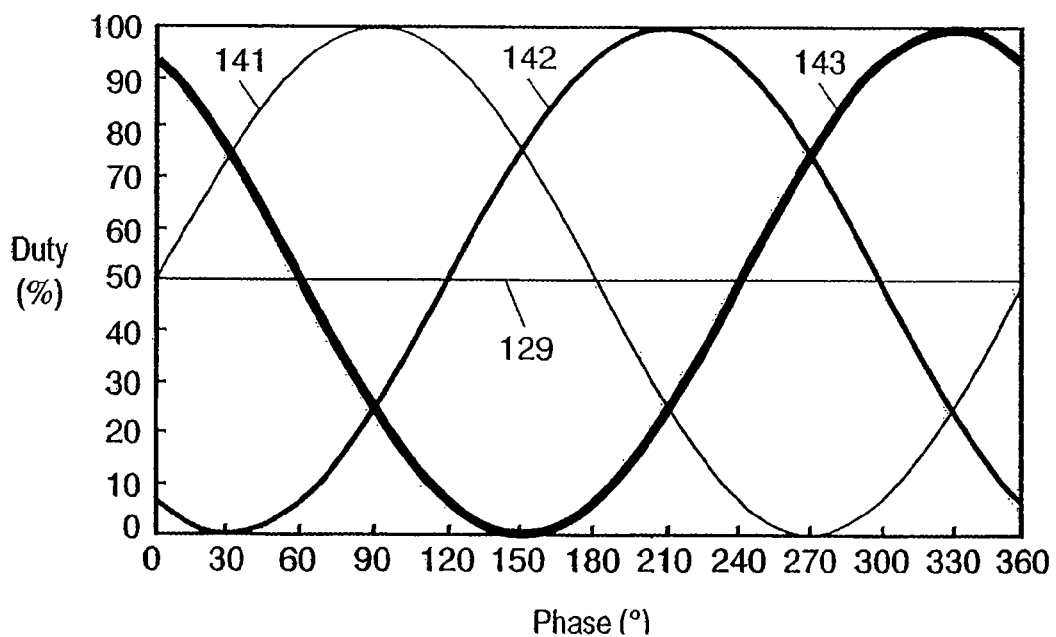
FIG. 31 shows modulated waveforms in each phase in the conventional three-phase modulation with a maximum modulation degree of 100%.
Figure 32:
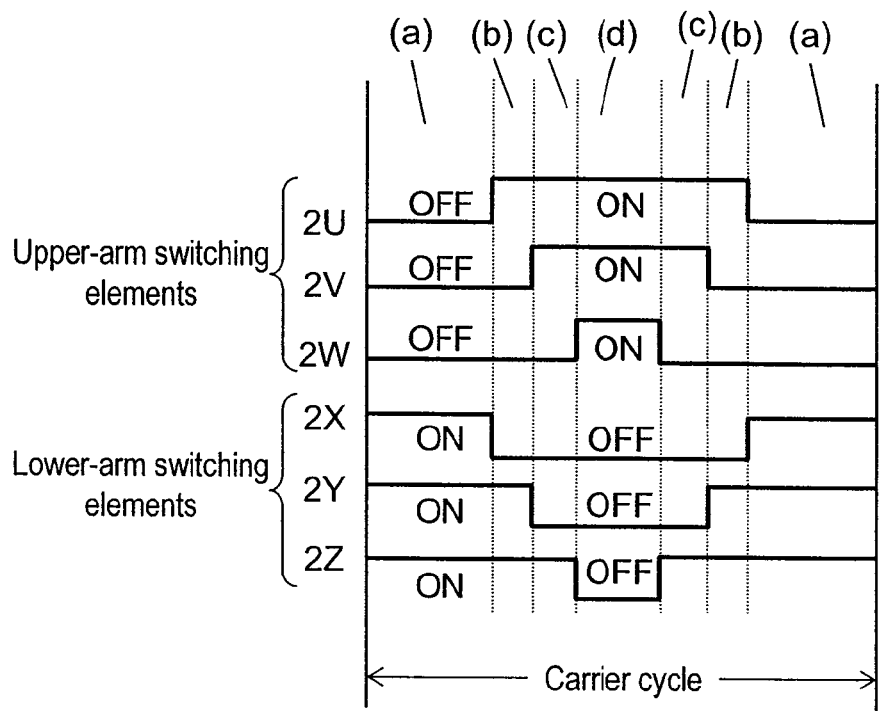
FIG. 32 is a timing chart of conventional three-phase modulation.
Figure 33:
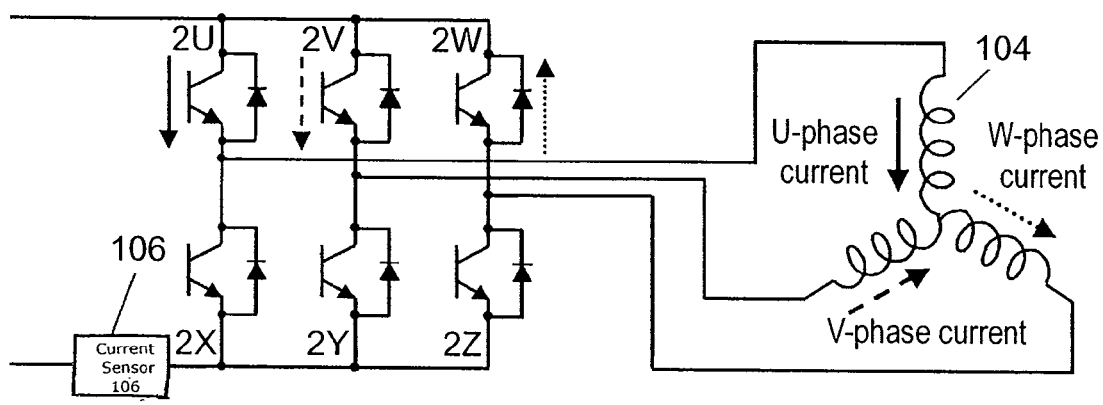
FIG. 33 is an electric circuit diagram showing the current path in period (d) in the conventional three-phase modulation.
Figure 34:
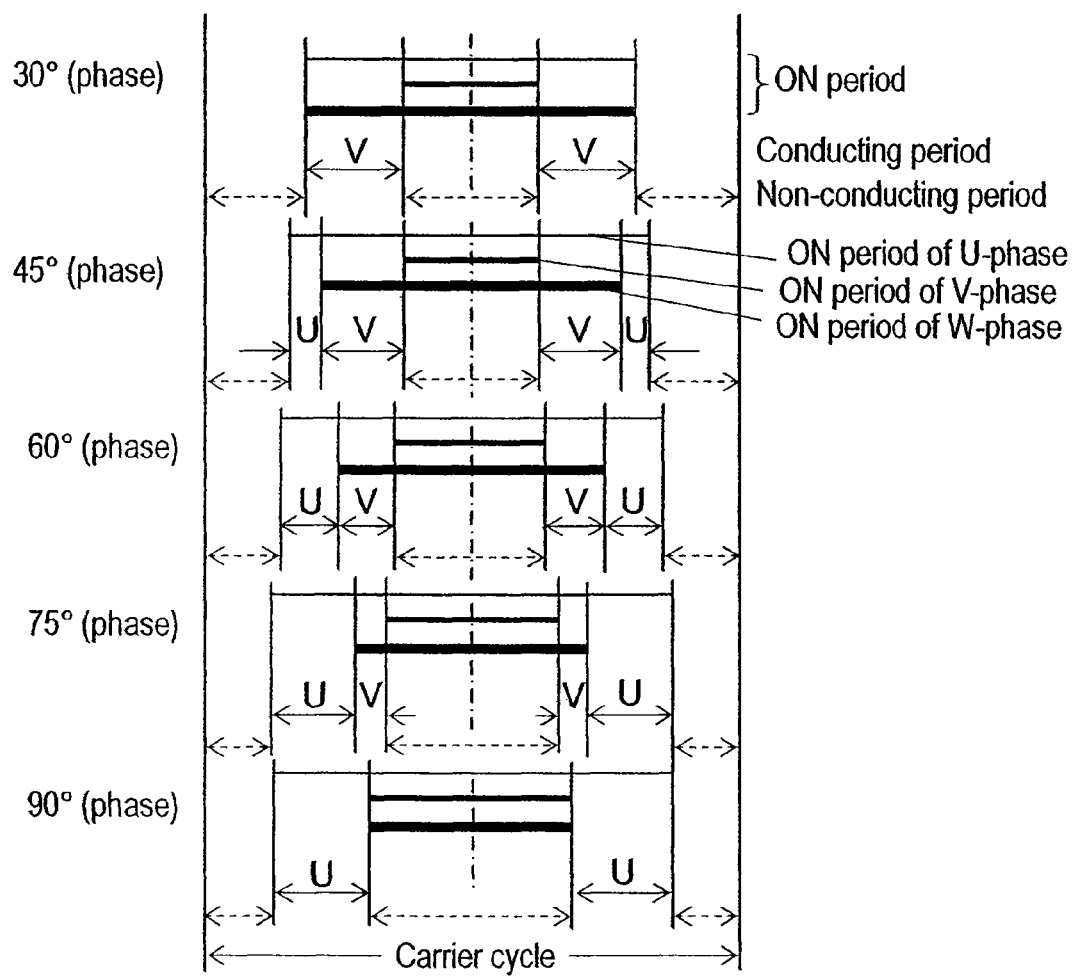
FIG. 34 shows the ON period, the conducting period and the non-conducting period of the upper-arm switching elements in each phase in the conventional three-phase modulation with a maximum modulation degree of 50%.
Figure 35:
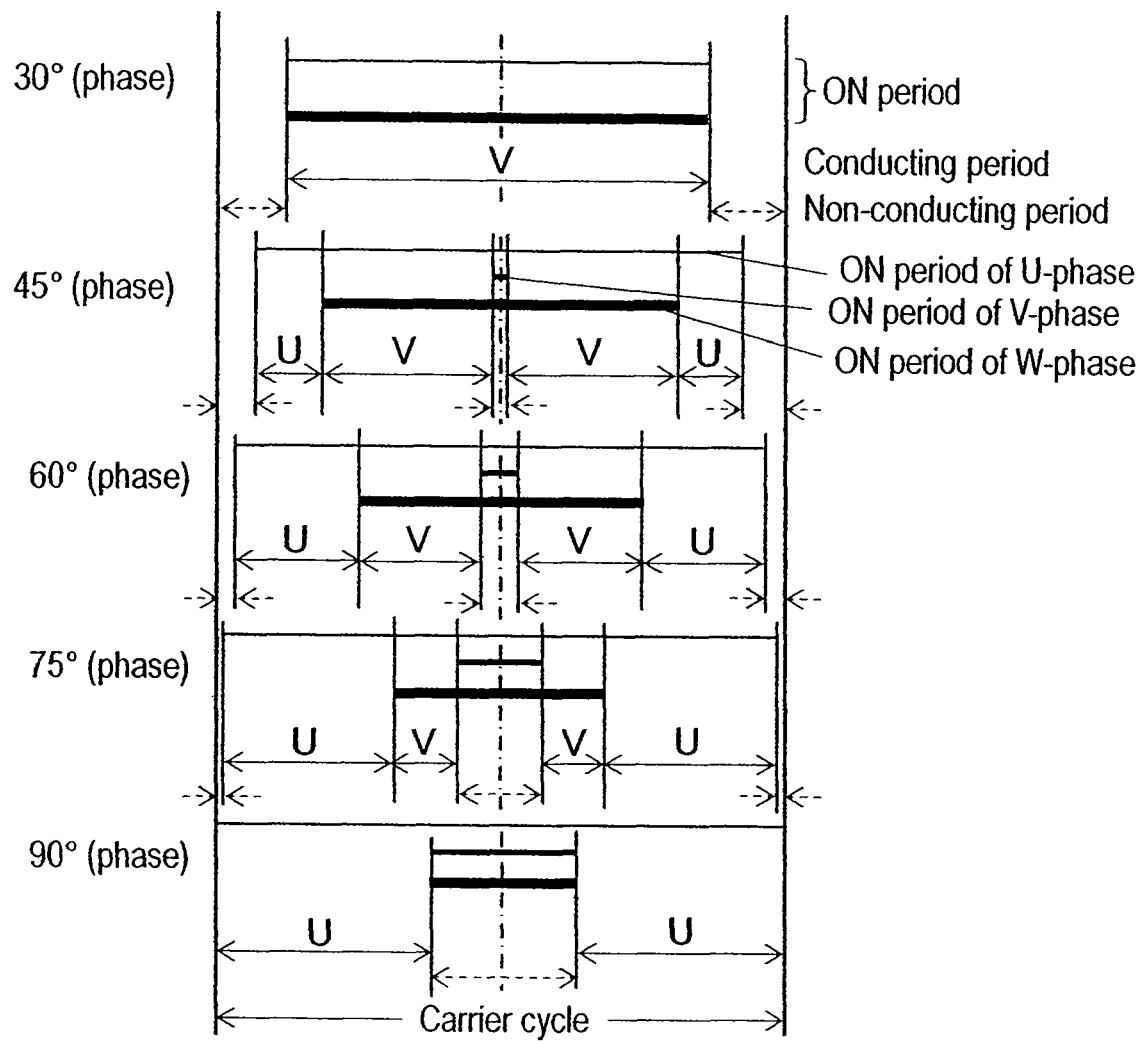
FIG. 35 shows the ON period, the conducting period and the non-conducting period of the upper-arm switching elements in each phase in the conventional three-phase modulation with a maximum modulation degree of 100%.

FIG. 22 shows an example in which the inverter device is employed for a vehicle in accordance with a seventh exemplary embodiment of the present invention.

Inverter device 60 (that corresponds to device 21 in FIG. 1) is installed, together with motor-equipped electric compressor 61, outdoor heat-exchanger 63 and outdoor fan 62, disposed in the engine room forward of the vehicle. In the interior of the vehicle, indoor fan 65, indoor heat-exchanger 67 and air conditioning controller 64 are disposed. Captured through air inlet 66, outside air undergoes heat exchange in indoor heat-exchanger 67 and then flows into the interior of the vehicle.

Electric compressor 61 disposed in the engine room transmits its noise and vibration through the car body to both inside and outside the vehicle. However, when an electric compressor is employed for a vehicle air conditioner, a soundproof structure is unlikely used from constraints on the installation space and weight. It is also difficult to use a vibration isolator for suppressing vibration so as not to transmit it to the interior of a vehicle.

However, the electric compressor driven by the inverter device of the present invention greatly reduces the occurrence itself of noise and vibration, offering silence effect in a vehicle. It is particularly effective in the use of vehicles without engine noise, such as an electric vehicle, a hybrid vehicle and a fuel-cell electric vehicle.

INDUSTRIAL APPLICABILITY

The inverter device of the present invention, as described above, considerably reduces noise and vibration. The device is therefore applicable to a variety of consumer and industrial products, particularly, suitable for a vehicle air conditioner.

The invention claimed is:

1. An inverter device comprising:
   three sets of series circuits formed by connecting two switching elements of each set of series circuits in series between a positive terminal and a negative terminal of a DC power supply, each set of series circuits including an upper-arm switching element and a connecting point connected to a motor; and
   a control circuit configured to switch DC voltage of the DC power supply by PWM 3-phase modulation so that a sinusoidal wave-shaped AC current is fed to the motor,
   wherein the control circuit allows the upper-arm switching elements to add the same ON-period to all phases or to subtract the same ON-period from all phases for a carrier cycle in the PWM 3-phase modulation so as to provide two conducting periods in the carrier cycle.

2. The inverter device of claim 1, wherein when there is a phase in which the upper-arm switching element has an ON period that accounts for 0% or at most 5% of the carrier cycle, the ON-period for adjustment is equally increased in all the phases.

3. The inverter device of claim 1, wherein when there is a phase in which the upper-arm switching element has an ON period that accounts for 100% or at least 95% of the carrier cycle, the ON-period for adjustment is equally decreased in all the phases.

4. The inverter device of claim 1, wherein the ON-period for adjustment is increased or decreased in a middle of the carrier cycle.

5. The inverter device of claim 1, wherein the ON-period for adjustment is equally increased or decreased in all phases so that a period during which all of the upper-arm switching elements turn on is equivalent in length to a period during which all of the upper-arm switching elements turn off.

6. The inverter device of claim 1, wherein the ON-period for adjustment is determined so as to form a continuous transition without a gap between the phases.

7. The inverter device of claim 1, wherein the ON-period for adjustment, which is to be increased or decreased equally in the phases, becomes greater as the PWM 3-phase modulation takes a higher modulation degree.

8. A vehicle air conditioner that employs the inverter device described in claim 1.

9. A vehicle air conditioner that employs the inverter device described in claim 2.

10. A vehicle air conditioner that employs the inverter device described in claim 3.

11. A vehicle air conditioner that employs the inverter device described in claim 4.

12. A vehicle air conditioner that employs the inverter device described in claim 5.

13. A vehicle air conditioner that employs the inverter device described in claim 6.

14. A vehicle air conditioner that employs the inverter device described in claim 7.

* * * * *